Oct. 22, 1940.                A. M. ROSSMAN                2,218,555
                           ELECTRIC SWITCHGEAR
                          Filed Dec. 28, 1936        11 Sheets-Sheet 1

INVENTOR.
Allen M. Rossman
BY Morris Spector
ATTORNEY.

Oct. 22, 1940.　　　A. M. ROSSMAN　　　2,218,555
ELECTRIC SWITCHGEAR
Filed Dec. 28, 1936　　　11 Sheets-Sheet 2

INVENTOR.
Allen M. Rossman
BY Morris Spector
ATTORNEY.

Oct. 22, 1940.   A. M. ROSSMAN   2,218,555
ELECTRIC SWITCHGEAR
Filed Dec. 28, 1936   11 Sheets-Sheet 3

INVENTOR.
Allen M. Rossman
BY Morris Spector
ATTORNEY.

Oct. 22, 1940.　　　A. M. ROSSMAN　　　2,218,555
ELECTRIC SWITCHGEAR
Filed Dec. 28, 1936　　　11 Sheets-Sheet 4

INVENTOR.
Allen M. Rossman
BY Morris Spector,
ATTORNEY.

Oct. 22, 1940.  A. M. ROSSMAN  2,218,555
ELECTRIC SWITCHGEAR
Filed Dec. 28, 1936  11 Sheets-Sheet 5
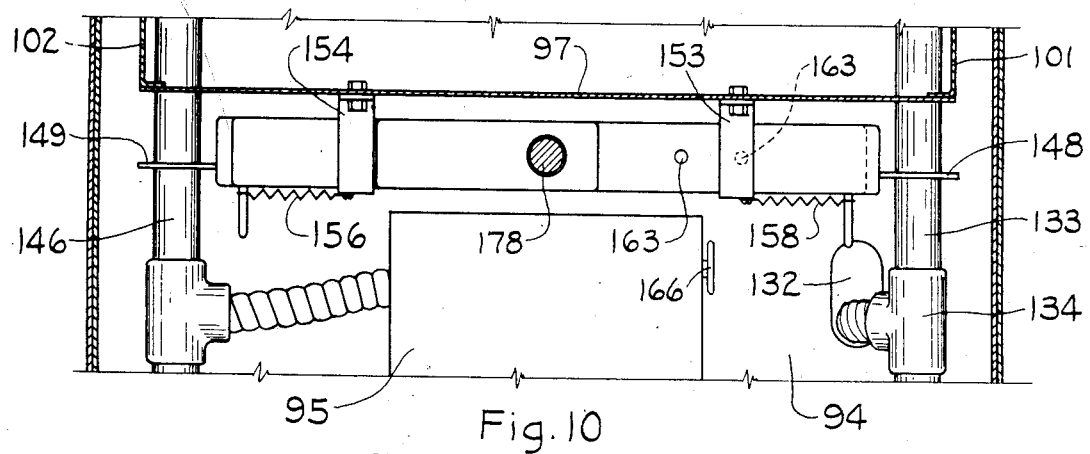
Fig. 10
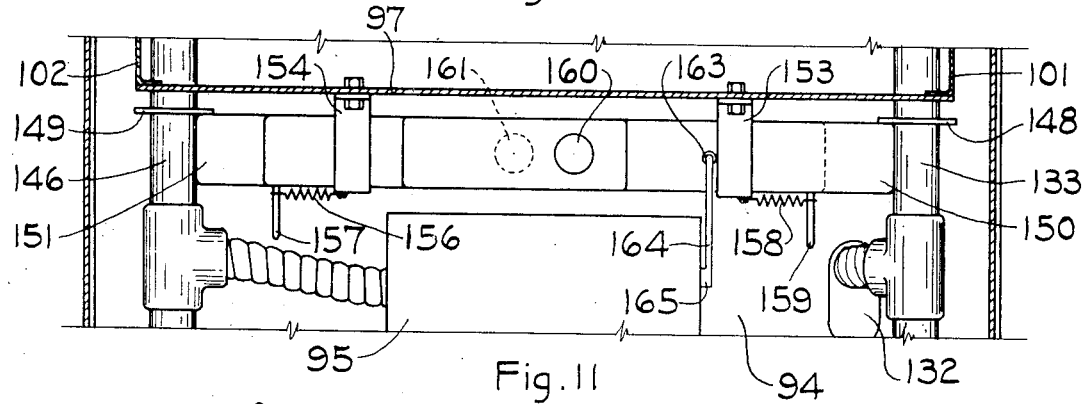
Fig. 11
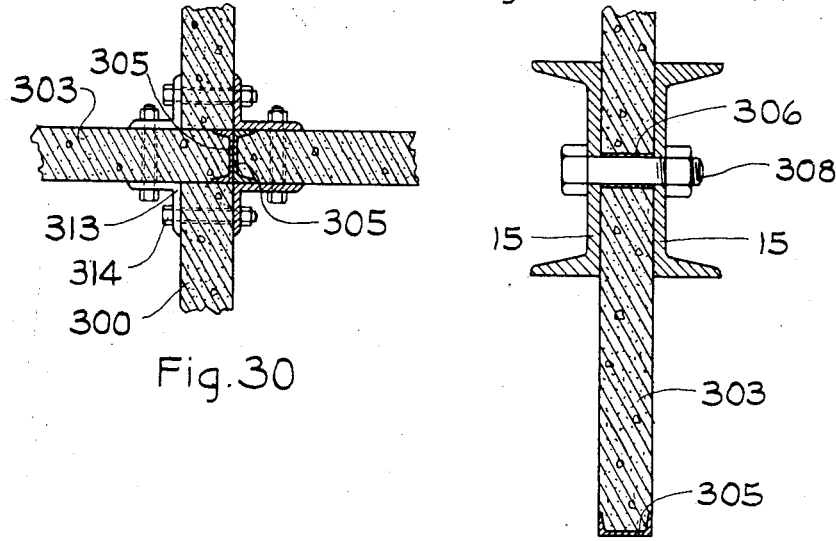
Fig. 30
Fig. 31
INVENTOR.
Allen M. Rossman
BY Morris Spector
ATTORNEY.

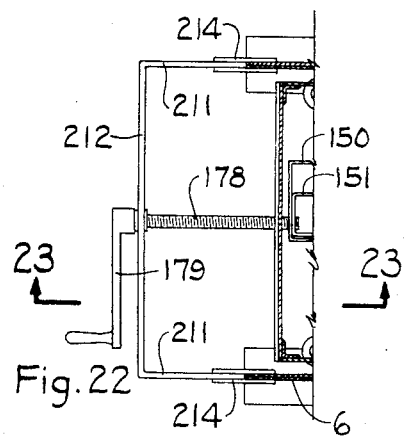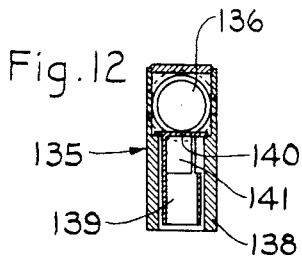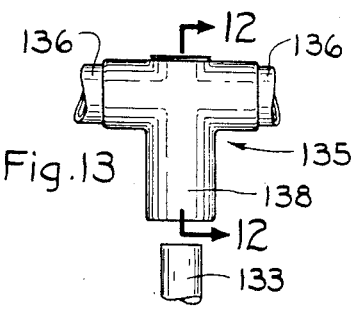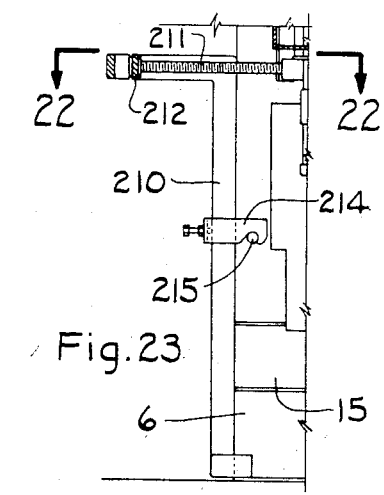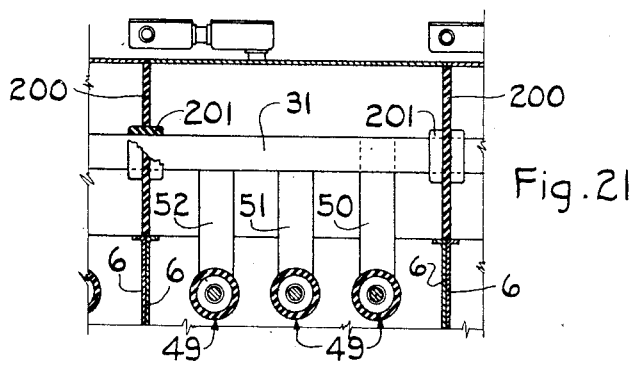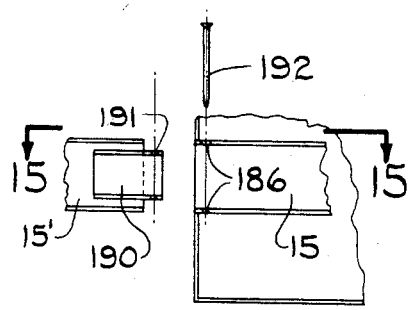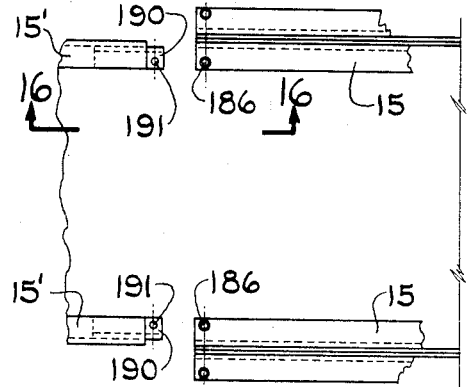

Oct. 22, 1940.  A. M. ROSSMAN  2,218,555
ELECTRIC SWITCHGEAR
Filed Dec. 28, 1936  11 Sheets-Sheet 7
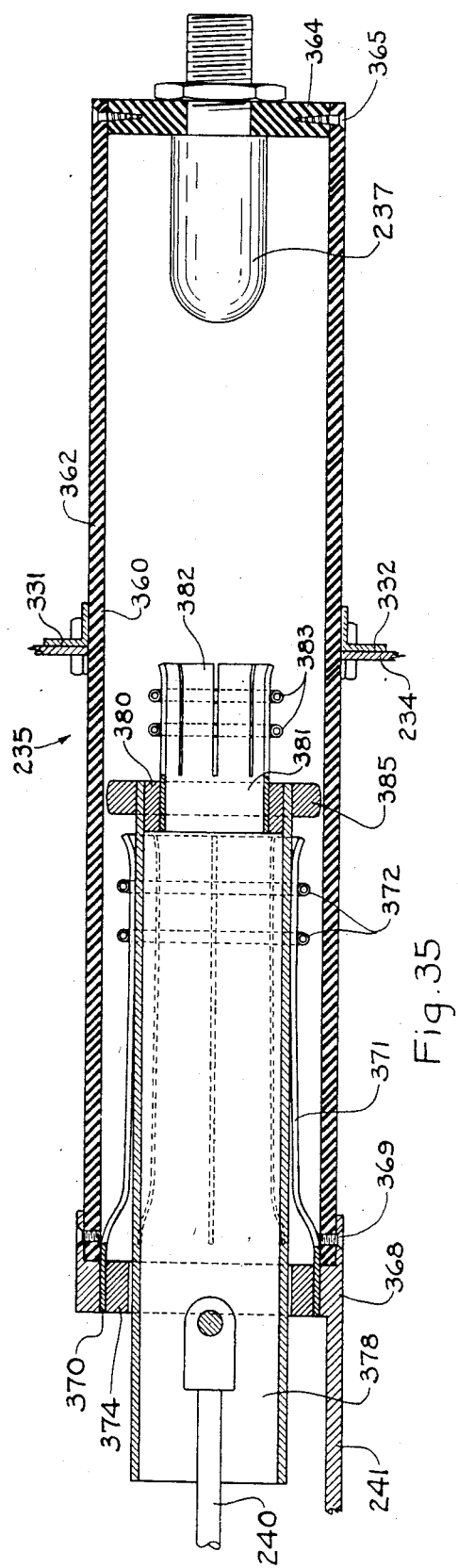
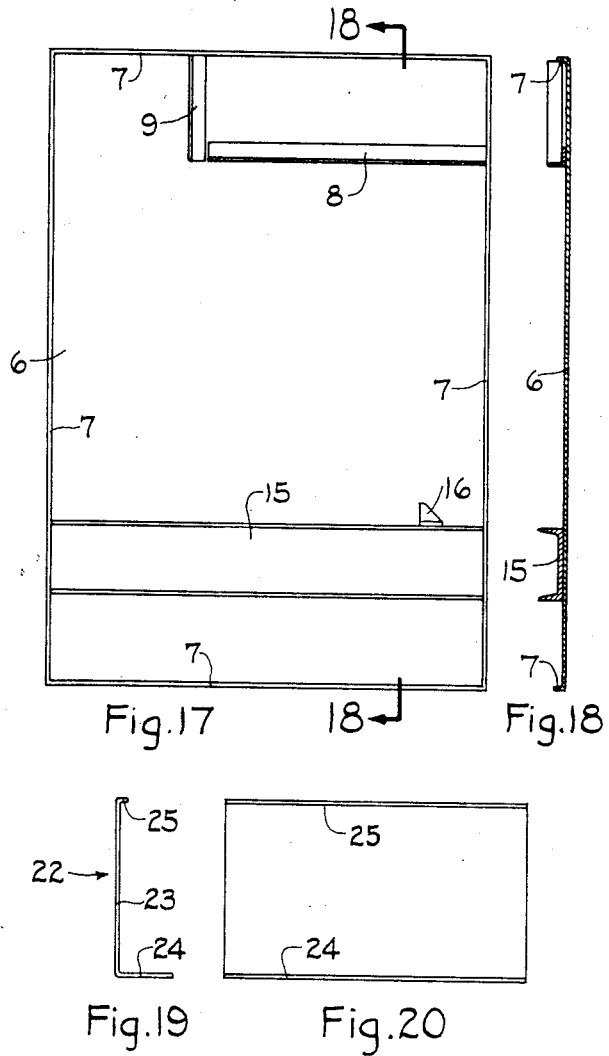
INVENTOR.
Allen M. Rossman
BY Morris Spector
ATTORNEY.

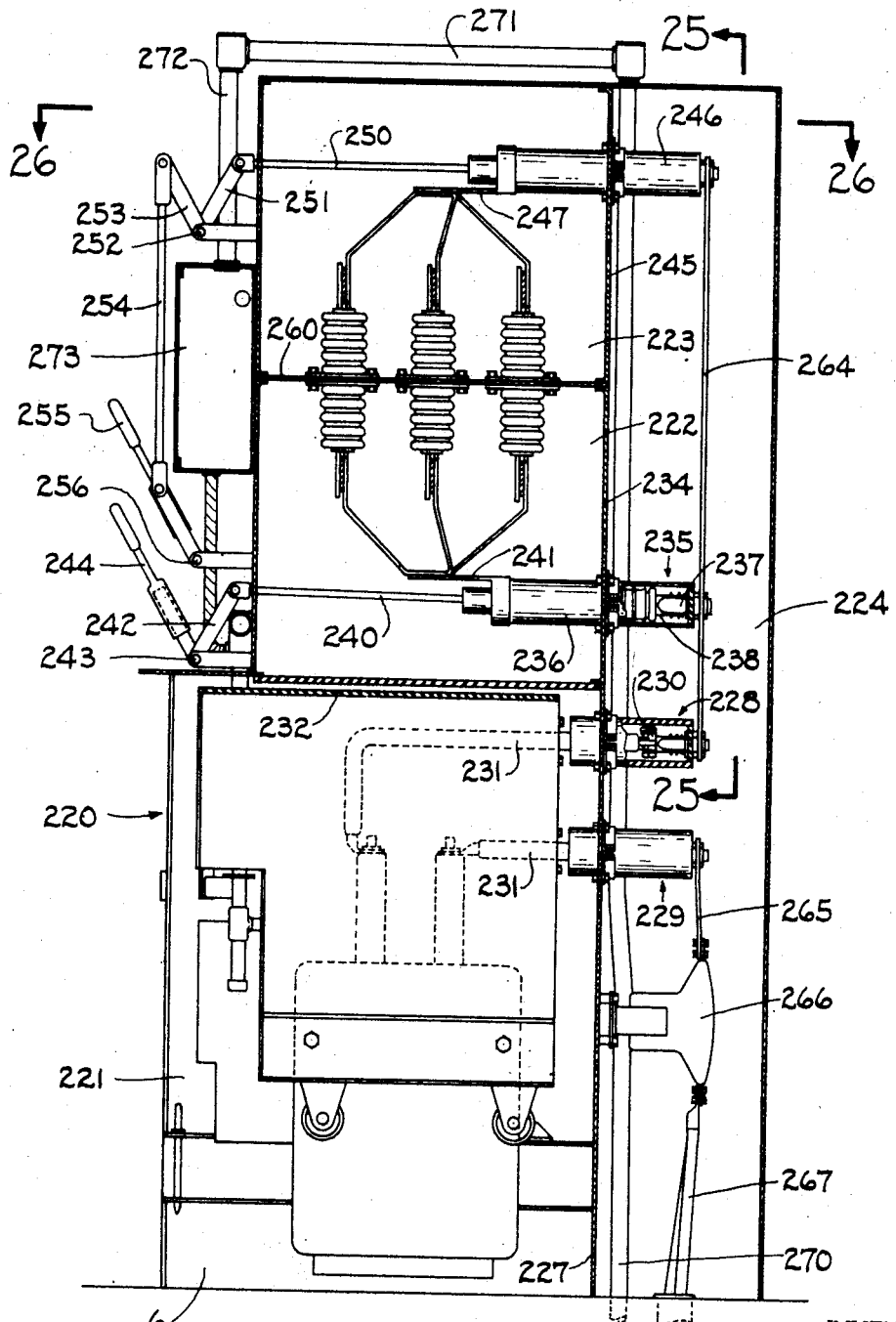

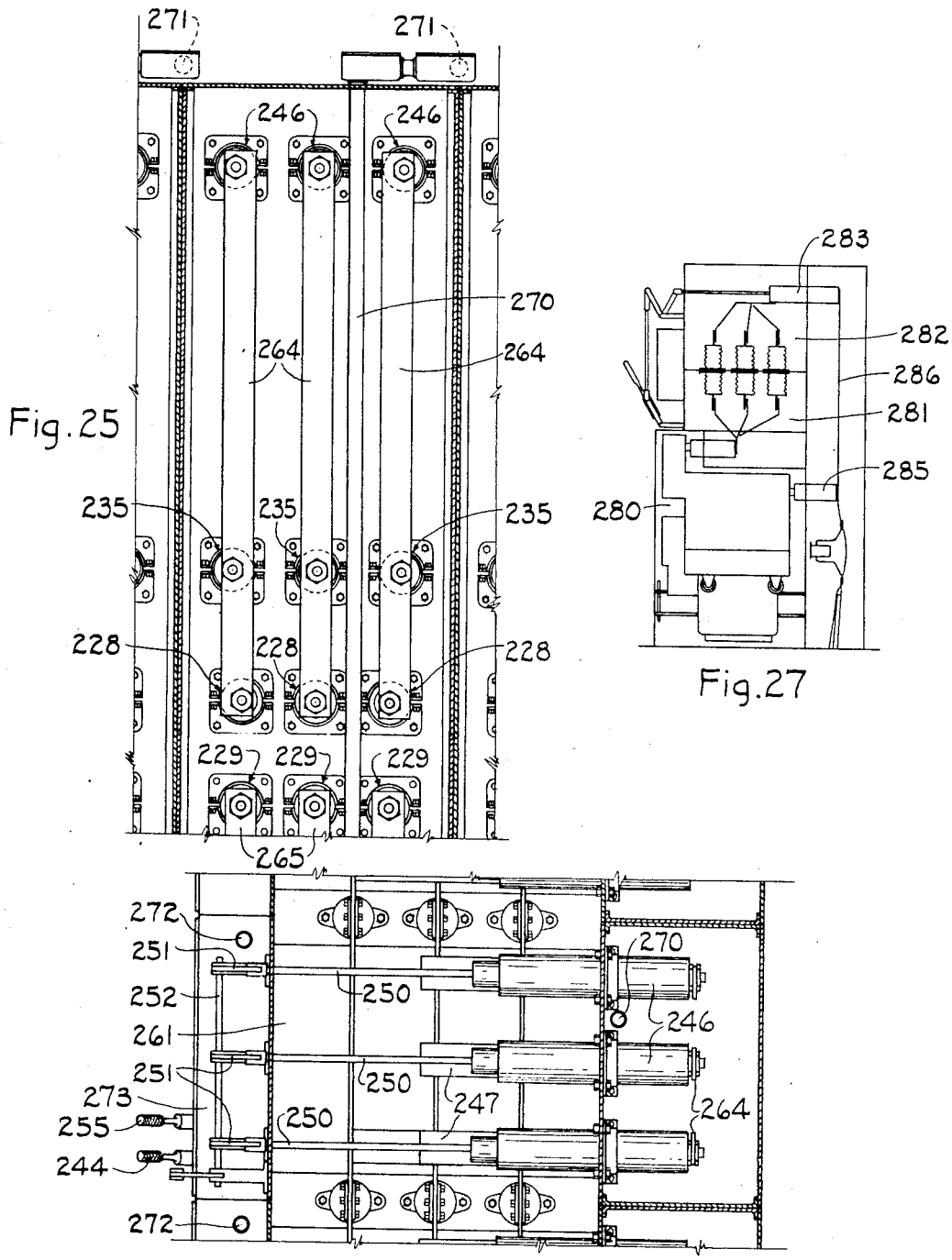

INVENTOR.
Allen M. Rossman
BY Morris Spector
ATTORNEY.

Oct. 22, 1940.  A. M. ROSSMAN  2,216,555
ELECTRIC SWITCHGEAR
Filed Dec. 28, 1936  11 Sheets-Sheet 11

INVENTOR.
Allen M. Rossman
BY Morris Spector
ATTORNEY.

Patented Oct. 22, 1940

2,218,555

UNITED STATES PATENT OFFICE 2,218,555

ELECTRIC SWITCHGEAR

Allen M. Rossman, Wilmette, Ill.

Application December 28, 1936, Serial No. 117,827

23 Claims. (Cl. 175—298)

This application is a continuation in part of my pending application, Serial No. 97,541, filed August 24, 1936.

This invention relates to electric switchgear, and more particularly switchgear for use on medium voltages, and medium current systems, such as metal clad switchgear, although not limited to switchgear of the metal clad type.

The switchgear of the present invention is of the horizontal drawout type adapted primarily, although not exclusively, to accommodate triple pole oil circuit breakers of the type having three poles in one tank, as disclosed in my pending application above referred to. In current practice, oil circuit breakers of the above type have a maximum operating voltage rating of approximately 15 k. v. and a maximum interrupting capacity rating of approximately 500,000 k. v. a.

It is a principal object of the present invention to provide a switchgear construction which will be more economical of construction without sacrificing safety or other desirable features of the metal clad type of switchgear. It is a further object of the present invention to provide such a switchgear wherein the various parts are more readily accessible than in the present standard construction.

Switchgear of the type with which the present invention is concerned generally, but not invariably, consist of a plurality of cells which are placed side by side, the number of cells being determined by the type and capacity of circuit or station involved. Each cell includes a lower compartment for receiving a circuit breaker, and an upper compartment for the bus-bars, the cells being located in alignment so that the bus-bar compartments of the respective cells form one continuous trough, with or without barriers between the cells, and through which trough the bus-bars extend longitudinally. The usual arrangement is such that the movement of the circuit breaker into proper position within the circuit breaker compartment establishes proper circuit connections to the circuit breaker. In the usual construction, that is, of the vertical-lift type of switchgear, the poles of the circuit breaker extend vertically upward and terminate in circuit breaker disconnecting contacts. These contacts cooperate with contacts carried by the lower wall of the bus-bar compartment, the arrangement being such that engagement between the cooperating disconnect contacts is made by the upward movement of the circuit breaker into position. Such arrangement necessarily precludes the possibility of access to the bus-bar compartment from the bottom thereof for repair, inspection or other purposes. I have invented a switchgear using a horizontally movable type of breaker, the construction being such that the connections are made with the circuit breaker in such a manner as to leave the bottom wall of the bus-bar compartment comparatively free so that it may be easily removed for access to the bus compartment from below, for inspection or other purposes.

It is a further object of the present invention to eliminate the necessity for insulating the bus-bars and other current carrying parts in the bus-bar compartment. In structures employing vertically movable circuit breakers, the center to center distances between the circuit breaker disconnects on the stationary structure are necessarily the same as the corresponding distances between the poles of the breaker. The circuit breakers are so compactly constructed that this distance is less than the minimum safe distance for bare conductors. The conductors from the stationary disconnects to the bus-bars must, therefore, be insulated. In view of the fact that the present switchgear utilizes the horizontally movable circuit breaker principle, rather than the vertical, the spacing between the disconnecting devices in the stationary structure may be increased over the pole spacings of the circuit breaker without interfering with the disconnecting function. Since there is more available space in the stationary structure than in the circuit breaker, I increase the spacing between the bus-bars and between the bus-bar leads, and I thus obviate the need for enclosing the bus-bars and the connections between them and the disconnects in insulation.

It is a further object of the present invention to eliminate the need for close tolerances in fabrication and assembly. This is accomplished by providing for relative aligning movement between certain engaging parts on the movable and on the stationary structures, and by providing means for guiding the movable contact members into proper registration with the stationary contact members even though the movable structure is considerably out of alignment with the stationary structure. Yielding means, such as springs, are provided for maintaining the relatively movable parts in proper position when they are free of one another while permitting relative motion between them to bring them into alignment in the event that the center of the movable switch member does not coincide or register with the center of the cooperating stationary switch member when they approach one another.

It is a still further object of the present invention to provide a switchgear with means whereby circuit breakers of different designs may be used with a given switchgear structure, without requiring extensive alterations. I accomplish this result by providing a movable structure in the cell of the switching unit, which movable structure is adapted to receive and support the oil circuit breaker. The movable structure includes the circuit breaker disconnect contacts that are movable into and out of engagement with registering contacts carried by the stationary structure. The circuit breaker is rigidly bolted in the movable structure, and suitable short leads connect the poles of the circuit breaker with the switch contacts carried by the movable structure. By this arrangement one circuit breaker may be replaced by another of different construction even though the spacing or location of the external poles or bushings of the two circuit breakers are different. The prior constructions wherein replacement could only be had by a circuit breaker of a construction substantially the same as the breaker replaced, put a considerable limitation upon the flexibility of the unit. Where new units or cells were to be added to an old system, it was necessary that the new units be of the same construction as the old, or separate spare circuit breakers had to be provided. By the present arrangement, the alignment between the movable structure and the stationary structure is independent of the alignment of the oil circuit breaker in the movable structure and independent of the positions of the bushings of the circuit breakers. It is thus possible to house any one of several different designs of oil circuit breaker in one movable structure.

It is a still further object of the present invention to provide a switchgear of the above character with an improved interlocking arrangement so that the breaker cannot be moved into or out of its operative position unless the breaker has been operated to its open circuit position.

It is a still further object of the present invention to provide improved venting means for the escape of gases produced during operation of the circuit breaker. I provide a common manifold for receiving the gases from each of the circuit breakers of a plurality of adjacent cells, the arrangement being such that the circuit breaker within any cell may be connected to the manifold, and cannot be moved out of its cell unless and until it is disconnected from the manifold.

It is a still further object of the present invention to provide an improved disconnect switch that is particularly adaptable for use to establish connections between a movable and a stationary structure, although not limited thereto, and characterized in that a proper contact is established between the stationary and the movable contacts of the switch even though the two are appreciably out of alignment.

It is a still further object of the present invention to provide an improved disconnect switch for use in establishing connections between bus-bars and other parts of the switching system, which switch may be mounted in the switchgear in such a manner as to afford ready access for operation and permit ready access into the bus compartment.

It is a still further object of the present invention to provide a switchgear construction wherein the walls of the unit may be made of preformed concrete, or the like, and readily assembled in the field. Where preformed reinforced concrete slabs are used, a single slab may be used between two adjacent units or cells of a switching station.

The attainment of the above and further objects of the present invention will be apparent from the following specification taken in conjunction with the accompanying drawings forming a part thereof.

In the drawings:

Fig. 10 is a sectional view taken along the line 10—10 of Fig. 8 and showing the interlocked mechanism in its released position;

Fig. 11 is a view similar to Fig. 10 and showing the interlocking mechanism in its locked position;

Fig. 12 is a sectional view through the vent valve for connecting the exhaust gas conduit from the circuit breaker to a common header, said view being taken along the line 12—12 of Fig. 13;

Fig. 13 is a fragmentary elevational view of the venting connection valve;

Fig. 14 is a sectional view taken along the line 14—14 of Fig. 5 and illustrating the secondary disconnect switch for establishing electrical connections to the control mechanism;

Fig. 15 is a fragmentary sectional view illustrating the manner in which a truck for transporting a breaker may be moved into position adjacent a switch housing for moving a circuit breaker to or from the housing;

Fig. 16 is a fragmentary elevational view taken along the line 16—16 of Fig. 15;

Fig. 17 is an elevational view of one of the side plates of the switchgear;

Fig. 18 is a sectional view taken along the line 18—18 of Fig. 17;

Fig. 19 is an end view of one of the plates forming the front of the bus-bar compartment and a portion of the top of the circuit breaker compartment;

Fig. 20 is an elevational view of the plate of Fig. 19;

Fig. 21 is a fragmentary sectional view illustrating an alternate method of supporting the bus-bars in the bus compartment;

Fig. 22 is a plan view illustrating an alternate circuit breaker retracting and inserting mechanism, said view being taken along the line 22—22 of Fig. 23, and looking in the direction of the arrows;

Fig. 23 is a sectional view taken along the line 23—23 of Fig. 22, and looking in the direction of the arrows;

Fig. 24 is a view corresponding to Fig. 2 and illustrating the principles of my invention applied to a switchgear of the type having two sets of bus-bars;

Fig. 25 is a sectional view taken along the line 25—25 of Fig. 24, and looking in the direction of the arrows;

Fig. 26 is a view taken along the line 26—26 of Fig. 24;

Fig. 27 is a diagrammatic view illustrating the principles of my invention as applied to a switchgear of the type including a main bus and a transfer bus;

Fig. 30 is an enlarged fragmentary sectional view taken along the line 30—30 of Fig. 29;

Fig. 31 is an enlarged fragmentary sectional view taken along the line 31—31 of Fig. 29;

Fig. 35 is a sectional view through the bus-bar disconnecting switch.

Reference may now be had more particularly to Figs. 1 to 14 inclusive. The switchgear here shown comprises a stationary structure having a lower compartment into which a circuit breaker is movable horizontally to establish circuit connections through the circuit breaker. Above the circuit breaker compartment is one or more bus-bar compartments, and to the rear of the circuit breaker compartment is a compartment for housing the incoming or outgoing circuit conductors or lines, the arrangement being such that the incoming line can extend to the switch housing from an upwardly or a downwardly direction. A plurality of such units are placed side by side, depending upon the number and kind of circuits at the station, so that the bus-bar compartments of the respective cells are in alignment. Bus-bars extend through the respective aligned cells in the form of continuous bars running from cell to cell. If desired, insulating barriers may be placed between the bus-bar compartments of adjacent cells, and those barriers may be made to support the bus-bars. The stationary structure comprising the cell of the switchgear of Figs. 1 to 7 inclusive, includes a circuit breaker compartment 1, a bus-bar compartment 2, and a current transformer compartment 3 into which the incoming or outgoing lines are extended. The stationary structure is made mainly of sheet metal, with suitable insulating sheets at the desired places, as will more fully appear as this description proceeds.

Figure 32:
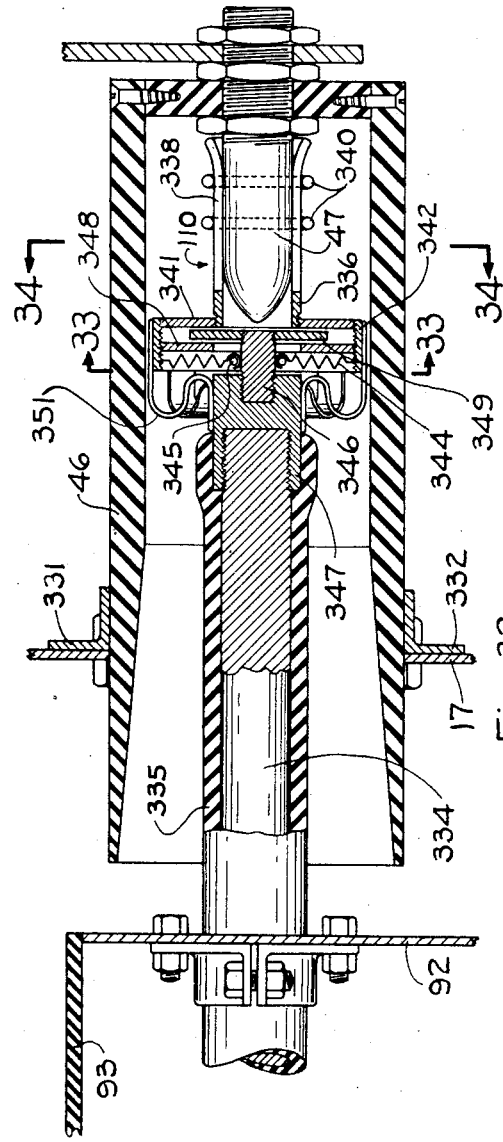
Fig. 32 is a sectional view through the circuit breaker disconnect switch.

The circuit breaker compartment 1 has two sheet metal sides 6—6 and a sheet metal back 17. Each of the sides 6—6 is of a construction such as shown more particularly in Figs. 17 and 18, and comprises a sheet metal plate, the edges 10 of which are turned inwardly to form a flange 7 extending around the entire periphery of the plate. Angle iron strips 8 and 9 are welded or otherwise suitably secured to the inner side of each sheet adjacent the top portion thereof. The angle iron strips 8 on opposite side walls 6 of the compartment serve as supports to which is bolted an insulating cover or barrier 10 for the circuit breaker compartment, which cover is also the lower wall of the bus-bar compartment 2. The strips 9 on opposite side walls 6 of the compartment serve as supports to which is bolted a plate 12 extending between opposite side walls of the circuit breaker compartment. The plate 12 carries three circuit breaker disconnecting terminals of a construction such as is shown in Fig. 32, and which will be more fully described as this description proceeds. A steel channel 15 is welded or otherwise suitably secured to each side plate 6 adjacent the lower edge thereof, and constitutes a supporting rail for the movable circuit breaker structure, to be more fully described presently. The stop 16 is welded to the top flange of the channel rail 15 adjacent the rear thereof, to limit the extent of rearward movement of the circuit breaker within the cell.

The rear wall 17 of the circuit breaker compartment extends above the top of the side walls of that compartment and constitutes also the rear wall of the bus-bar compartment. The top edge of the rear wall 17 is bent forwardly to form a short flange 20, which flange 20 acts as a support for a cover plate 39 for the bus-bar compartment and as a support for a plate 35 on which is mounted the bus-bar supporting insulators. An angle iron plate 22, of a shape such as is shown more particularly in Figs. 19 and 20, serves to complete the front closure of the bus-bar compartment. This plate includes a vertical portion 23, and a lower horizontal portion 24, which serves also as a part of the top of the circuit breaker compartment. The top of the plate 22 has a rearwardly bent flange 25 which corresponds, functionally, to the flange 20 of the back plate 17. An additional flat sheet metal cover plate 28 is provided for the upper front portion of the circuit breaker compartment, said sheet metal plate resting on and being welded to the upper peripheral flange of the opposite side walls 6 of the circuit breaker compartment, and being continuous at its lower side with the lower surface of the plate 24. The plate 28 has two holes therethrough adjacent its rear edge, one at each side of the switch housing, which holes receive the pipes for the venting of the circuit breaker and for the control conductors, and also act as a part of an interlocking system, as will be more fully described.

In Figs. 1, 3, 4, 5 and 6, I have shown a complete cell with fragmentary portions of adjacent cells of like construction. In the embodiment of the invention illustrated in Figs. 1 through 7, the bus-bar compartment of each cell comprises a hollow trough having top, bottom, front and rear walls, but no side walls, so that by placing adjacent cells in abutment with one another, the troughs forming the respective bus-bar compartments are in alignment and constitute one long trough through which the bus-bars extend. There are three bus-bars, one for each phase, as indicated at 31, 32 and 33 respectively. The bus-bars are supported by insulators 34, three such insulators being mounted in alignment upon a plate 35 which is bolted to the flanges 20 and 25 of the rear and front walls, respectively, of the bus-bar compartment. One bus-bar supporting plate, 35, is located at each junction of adjacent switching units. Each bus-bar extends continuously through a plurality of switching units, being supported by clamps 36, (Fig. 3), at the lower end of each insulator. A cover plate 39 is bolted to the flanges 20 and 25 of the rear and front walls of the bus-bar compartment, and extends from one bus-bar supporting plate 35 to the adjacent bus-bar supporting plate 35. The cover plate 39 is removable for inspection or repair purposes, and thus allows ready access to the bus-bar compartment from above.

The insulating plate 10 which is bolted to the lower flange of the angle strips 8 and extends between the two walls 6 of the circuit breaker compartment, constitutes the bottom of the bus-bar compartment and is removable to permit access to the bus-bar compartment from below.

The rear wall 17 of the circuit breaker compartment carries three circuit breaker disconnecting switch terminals 45 mounted in horizontal alignment, which terminals include a stationary contact that is adapted to receive a cooperating contact carried by the movable structure, which cooperating contact engages the stationary contact when the circuit breaker is brought into its proper position in the compartment. The terminal which is mounted on the stationary part of the switch structure, and the cooperating terminal which is mounted on the movable part of the switch structure together form a circuit breaker disconnecting switch, which is illustrated more particularly in Fig. 32, and which will be described more fully as this description proceeds. It is sufficent here to state that each switch includes a tube of insulation, 46, in which is mounted a stationary contact finger 47, and that the movable contact structure that is moved into engagement with the contact finger 47 is mounted in such a manner as to permit an appreciable movement thereof in all directions so that the tube 46 may guide the movable contact into proper engagement with the stationary contact 47 even though the structure carrying the movable contact is appreciably out of alignment with the stationary contact. By this arrangement the need for extreme precision in aligning the movable circuit breaker structure with the stationary structure is eliminated.

Three circuit breaker disconnecting terminals 49, which are of the same construction as the terminals 45, are mounted in horizontally spaced alignment on the plate 12 at the forward part of the circuit breaker compartment. The stationary terminals of these switches are connected by copper bars 50, 51 and 52 to the respective bus-bars 31, 32 and 33, the joints between the connecting bars 50, 51 and 52 and busses 31, 32 and 33, respectively, being made in the field. The stationary contacts of the rear circuit breaker disconnecting terminals are connected by means of conductors 54, 55 and 56, (Fig. 4), to the incoming conductors 57 through suitable current transformers 58. In the present construction the incoming line conductors extend to the transformer compartment from underground. It is to be noted that the space above the circuit breaker disconnecting terminals 45 is unobstructed. By this arrangement the current transformers 58 may be mounted above the terminals 45 when the line 57 extends into the compartment 3 from above, instead of from below.

A description will now be given of the movable structure that includes the circuit breaker, from which description it will be seen that the respective circuit breaker disconnecting terminals 45, and the respective disconnecting terminals 49, for the three phases, are spaced apart a distance greater than the spacing between poles of the circuit breaker. By reason of this greater spacing of the disconnecting terminals, it is possible to rely upon air insulation, thus dispensing with the need for insulating the respective conductors 50, 51, 52 that extend to the bus-bars, and the respective conductors 54, 55, 56 that extend to the current tranformers.

The circuit breaker is illustrated at 70 and includes the usual tank 71 depending from a head 72 from which the bushings 73, 74 and 75, and the bushings 76, 77 and 78 (Figs. 2, 3 and 6), extend vertically. This is the usual construction in circuit breakers that are designed for vertical movement in a circuit breaker compartment, as was heretofore the standard practice. The circuit breaker includes a rectangular flange 80 at the juncture between the head and the tank. I propose to mount this circuit breaker in a movable structure by means of this flange 80. The movable structure in which the circuit breaker is mounted is indicated in general by the reference numeral 81, and includes two side beams 82—83 carrying wheels 84—84 at their lower ends. The circuit breaker is secured in place between the beams 82—83 by four angle clips 86, one at each corner of the flange 80. The movable structure includes sheet metal side walls 90, 91, a sheet metal rear wall 92, an insulating top wall 93 comprising a barrier, and a sheet metal front wall 94 which has a vertical, rectangular opening at the lower portion thereof to permit the circuit breaker operating mechanism 95 to project therethrough, as may be seen in Fig. 5. The upper front portion of the movable structure terminates somewhat above the insulating barrier 93 at a box-like structure 96 including a bottom 97, a front 98, a top 99, and a rear wall 100 and side walls 101 and 102 (Fig. 6). The side walls 101 and 102 are welded or bolted to the side walls 90 and 91 of the movable structure, respectively.

The rear wall 92 of the movable structure carries three horizontally aligned circuit breakers disconnecting contacts indicated at 110, 111 and 112, which cooperate with the disconnecting contacts 45 on the rear wall 17 of the circuit breaker compartment. As may be seen from Fig. 6, these disconnecting contacts 110, 111 and 112 are spaced apart a greater amount than the spacing between the poles 73, 74 and 75 of the circuit breaker. The spacing of the poles of the circuit breaker is determined by the physical dimensions of the breaker. Where the breaker is made as small as possible, the three poles 73, 74 and 75 are quite close together and must, therefore, be covered with insulation to provide adequate safety for the voltages encountered. The rear wall 92 of the movable structure necessarily has more space for the conductors of the respective phases, and by utilizing this additional space those conductors can be spaced sufficiently far apart to eliminate the need of insulating wrappings around the conductors that extend from the circuit breaker disconnecting terminals. This result is accomplished merely by utilizing the additional space available in the wall of the circuit breaker compartment over and above the spacing available in the circuit breaker itself. To accomplish this result, the conductors from the respective poles 73, 74 and 75 of the circuit breaker are outwardly spread as they extend to the circuit breaker disconnecting contacts 110, 111 and 112. The terminals 110, 111 and 112 are of a construction such as is shown more particularly in Fig. 32, to which reference will be had as this description proceeds.

A set of three circuit breaking disconnecting contacts 115, spaced horizontally from one another, are mounted in the wall 100 of the movable structure and cooperate with the respective contacts of the switch portion 49 mounted in the wall 12. Insulated conductors 118 extend from the respective poles 76, 77 and 78 to the contacts 115. These contacts are also of the construction shown in Fig. 32. As may be seen from Figs. 1, 3 and 6, the conductors 118 of the three phases are spaced from one another at their free or disconnect contact making end by an amount greater than their spacing at the end where they are connected to the poles of the circuit breaker. This additional spacing is possible because the width of the bus-bar compartment is necessarily greater than the width of the circuit breaker. By utilizing the increased width of the bus-bar compartment to space the circuit breaker disconnecting contacts a greater distance apart, I eliminate the need for applying insulation to the connecting conductor bars 50, 51 and 52 (Fig. 2). It is thus apparent that the present construction utilizes the space which is necessarily available, to obtain maximum clearance dimensions between live parts of different phases and between live parts and ground. The center to center distance between the circuit breaker disconnecting devices is greater than the center to center distance between oil circuit breaker bushings, and the distance between the circuit breaker disconnecting devices and ground is also greater than the distance between the oil circuit breaker bushings and ground.

It is to be noted that the connections from the bushings 73, 74 and 75 of the circuit breaker do not extend through the bottom wall of the bus-bar compartment. Therefore the space heretofore taken by such connections, in the usual vertically movable structures, is unencumbered thereby permitting ready access to the bus-bar compartment from below.

The movable structure is supported by wheels mounted on the rails 15 of the side walls of the bus-bar compartment. The circuit breaker disconnecting terminals are constructed in such a manner that they have considerable latitude of movement and are guided into proper position by the outwardly flared or tapered open end of the insulating tubes 46 associated with the terminals of the stationary structure, as will be more fully set forth in the description of the switch shown in Fig. 32. This eliminates the necessity for close tolerances in fabrication and assembly of the structures.

The circuit breaker is mounted in the movable structure, and the terminals of the circuit breaker are connected to the circuit breaker disconnecting contacts of the movable structure by conductors that remain stationary with respect to the circuit breaker as long as the circuit breaker is within the movable structure. By this arrangement, any circuit breaker of the requisite current and voltage characteristics may be mounted within the movable structure without regard to the particular locations of the circuit breaker bushings. In the prior constructions, wherein the circuit breaker itself carries the disconnecting contacts that engage the contacts carried by the stationary structure, it is not possible to effect a ready replacement of one type of circuit breaker with another. This means that in a large substation employing many circuit breakers they must all be of the same construction, or spare circuit breakers of each design used must be provided.

An explanation will now be given of the manner of making the secondary control connections to the circuit breaker operating mechanism and of the manner of connecting the circuit breaker venting outlet to a common header or exhaust conduit, for which reference may be had to Figs. 2, 3, 5 and 8 to 14, inclusive. Each circuit breaker is provided, at one side, with a venting outlet for the escape of gases that are produced during circuit interruption, as is well known in the art. This outlet is shown at 130 in Figs. 2 and 3. A flexible steel pipe or conduit, 131, is connected to the outlet 130 and extends through an oversized opening 132 in the front wall 94 of the movable circuit breaker supporting structure. The conduit 131 is connected to a vertically movable pipe 133 by means of a T connection 134. The pipe 133 extends through aligned openings in the plates 97, 99 and 28, to a check valve 135 (Fig. 2), that controls communication with an exhaust conduit or header 136 that extends along the front of the bus-bar compartment for the full length of the set of side by side switching units.

The valve 135 is shown more particularly in Figs. 12 and 13, to which reference may be had. The valve includes a T coupling for joining adjacent pipe lengths of the header 136. The coupling has a stem 138 in which projects a short tube 139 that terminates at its top in a disc 140 which constitutes a check valve which normally closes off communication between the header 136 and the stem 138. When the tube 139 is raised, communication is established between the header 136 and the lower outlet of the stem 138 through slots 141 in the tube 139. When the pipe 133 is raised so that its upper end projects through an opening in the plate 28 and into the stem 138 of the valve 135, the pipe 133 raises the tube 139, thus opening the check valve 140 and establishing communication between the pipe 133 and the common exhaust header 136. Exhaust gases can now flow from the circuit breaker, through the connection 131, pipe 133, valve 135, to the common exhaust header 136. When the pipe 133 is lowered to disestablish connections between the circuit breaker and the header 136, the disc 140 of the check valve seats to close the outlet of the stem 138 of the T-shaped check valve 135, while permitting unobstructed flow of gases through the connected portions of the lengths of pipe 136 at the T. The pipe 133 may be lowered until its upper edge is below the top of the plate 28. In order to facilitate raising of the pipe 133, the holes in the plate 28 and in the plates 97 and 99 are oversized to permit the operator to wabble the pipe 133 slightly to pass the top of the pipe through the opening in the plate 28.

Figure 5:
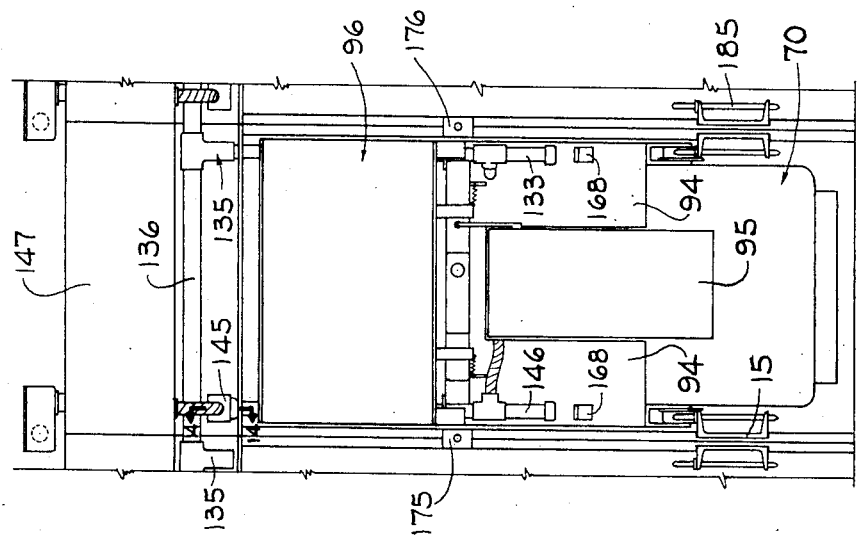
Fig. 5 is a front view of the switchgear, said view being taken along the line 5—5 of Fig. 2, and looking in the direction of the arrows.
Figure 4:
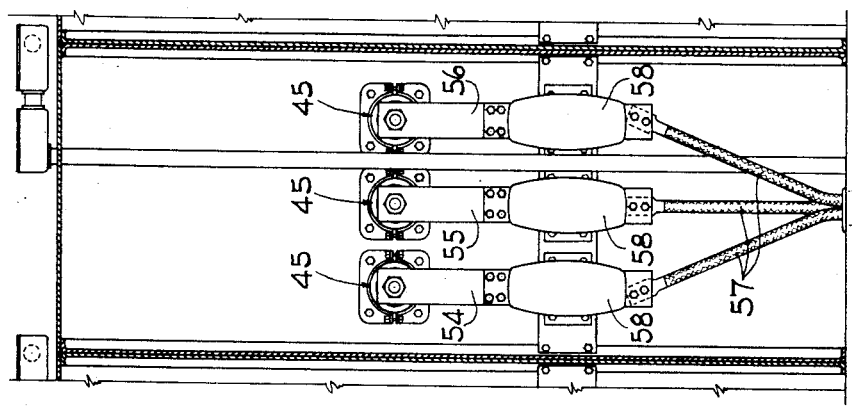
Fig. 4 is a rear view of the switchgear being taken along the line 4—4 of Fig. 2, and looking in the direction of the arrows.
Figure 3:
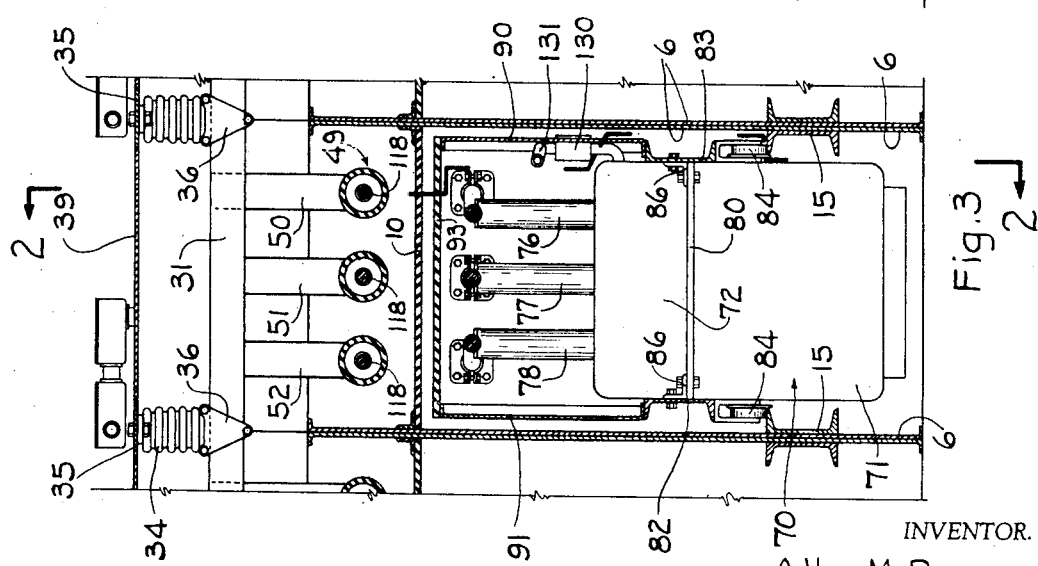
Fig. 3 is a sectional view taken along the line 3—3 of Fig. 2, and looking in the direction of the arrows.
Figure 6:
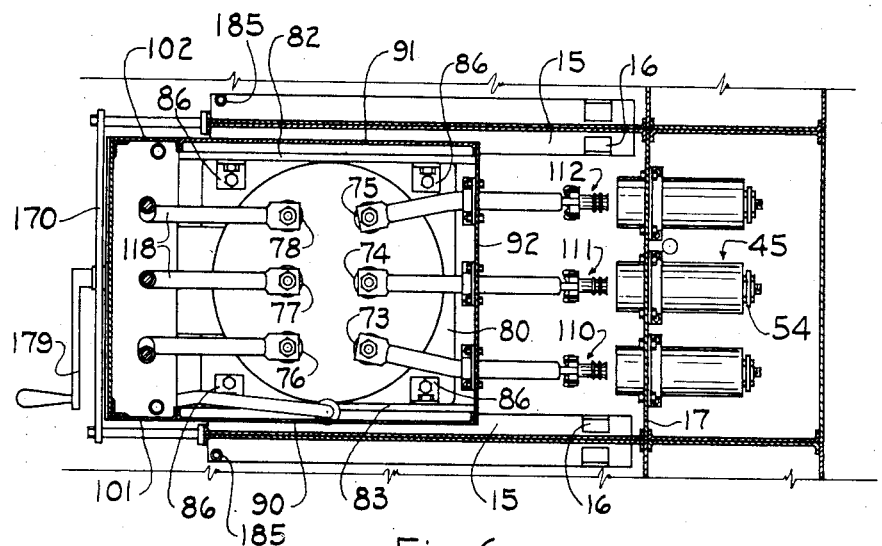
Fig. 6 is a sectional view taken along the line 6—6 of Fig. 2, and looking in the direction of the arrows, but with the breaker withdrawn.
Figure 7:
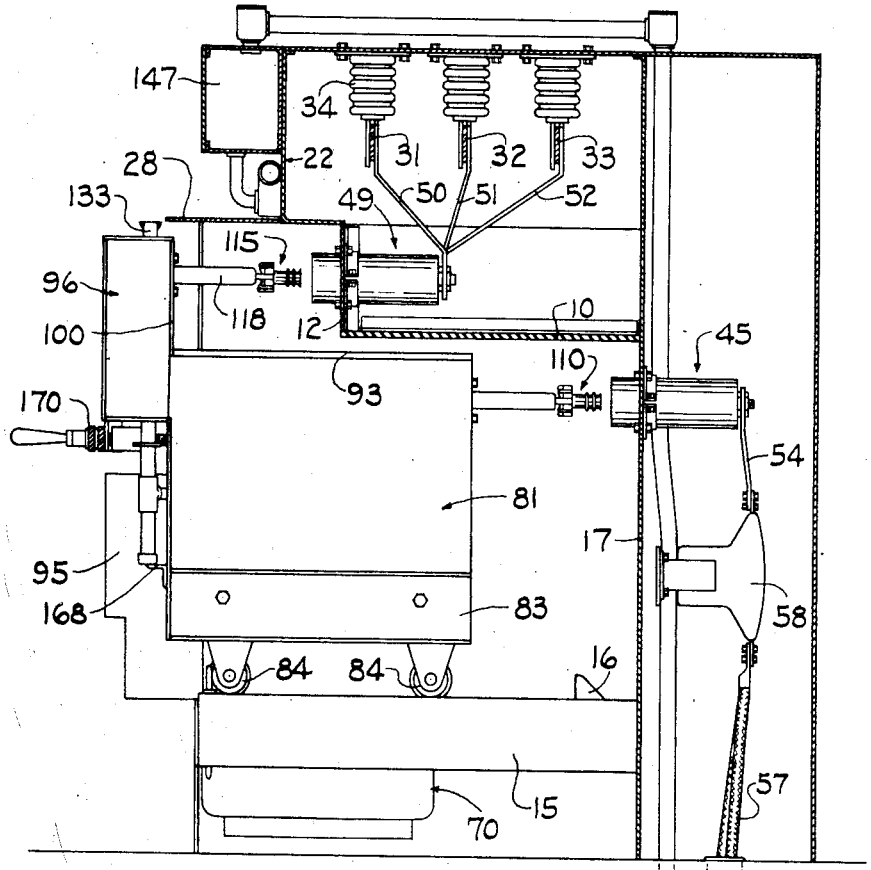
Fig. 7 is a view corresponding to Fig. 2 and showing the circuit breaker in its retracted position.

Secondary control connections to the circuit breaker operating and control mechanism are made through a secondary disconnecting switch 145 of the plug and socket type, the location of which is shown in Fig. 5, and the construction of which is shown more particularly in Fig. 14. One set of contacts of the switch 145, namely the male contacts, are carried at the upper end of a pipe 146 which is vertically movable to bring the male contacts into and out of engagement with the cooperating female contacts on the stationary structure. The pipe 146, like the pipe 133, extends through openings in the plate 28 and in the plates 97 and 99, which openings are made oversize in order to permit a limited wabbling of the pipe 146 by the operator to bring the male contacts into registering engagement with the female contacts of the switch, even though the movable circuit breaker carrying structure is not in precision alignment within the stationary structure. The secondary control conductors extend through a flexible conduit to a splicing chamber 147 to which the conductors are extended through pipes in any desired manner. The box 147, which is located at the front of the bus-bar compartment, supports the control relay which closes the oil circuit breaker control circuit, said relay being mounted on the front wall of said box. The inside of the box 147 serves as a junction box for control wires from the operating solenoid of the oil circuit breaker, control wires from the operating center, tap-off wires from the direct current control buses, which pass through the box from unit to unit, and for connections to the control relay. Space is available in this box for terminal blocks for any or all of these circuit control wires.

The pipe 133 has a disc 148 welded thereto, and the pipe 146 has a similar disc 149 welded thereto. When these pipes are in their raised position, the disc 148 rests on the right-hand end of a horizontally movable slide bar 150, and the disc 149 rests on the left-hand end of a similar horizontally movable slide bar 151, as is shown in Fig. 11. These slide bars are supported by depending brackets 153 and 154 that are secured to the wall 97 of the movable circuit breaker supporting structure, and are free to slide through the brackets. The bar 150 is continuously urged to the right, as seen in Fig. 10, by a tension spring 156 that extends from the bracket 154 to a pin or handle 157 that is secured to the bar 150. In a like manner the bar 151 is urged to the left, as seen in Fig. 11, by a tension spring 158 that extends from the bracket 153 to a pin or handle 159 secured to the bar 151. The handles 157 and 159 facilitate manual movement of the bars 150 and 151 towards one another to bring the ends of those bars from under the discs 148 and 149 to permit the pipes 133 and 146 to drop. The bars 150 and 151 each have a channel bend therein, as it may be seen in Fig. 8. The bar 150 has a hole 160 therein, and the bar 151 has a hole 161 therein, which holes are out of register with one another when the bars are in their normal position when the circuit breaker is properly and completely positioned within the bus-bar compartment, as may be seen in Fig. 11. When the handles 157 and 159 of the bars 150 and 151 are moved towards one another to bring the bars out of the paths of movement of the discs 148 and 149, the holes 160 and 161 are brought into register with one another, as may be seen in Figs. 8 and 10.

When the pipes 133 and 146 are in their raised position, and held in that position by the bars 150 and 151, they prevent retraction of the movable structure that carries the circuit breaker. Any attempt to retract the movable structure from the circuit breaker compartment is resisted by the engagement of the pipes 133 and 146 with the plate 28 through which the pipes extend. In order to withdraw the circuit breaker from the circuit breaker compartment, it is necessary first to effect a lowering of the pipes 133 and 146 to clear the plate 28, which can be done only by first moving the bars 150 and 151 towards one another so that the bars clear the discs 148 and 149. When this is done, the circuit breaker is tripped, as will be presently described.

Each of the bars 150 and 151 has an additional hole 163 therein, which holes are brought into alignment with one another when the bars are in their locking position, as illustrated in Fig. 11, and are out of alignment when either bar is in a position to permit dropping of its associated pipe 133 or 146. A latch 164 is located on the housing of the circuit breaker tripping mechanism, being mounted on a pin or shaft 165 (Figs. 9 and 11), so that upon turning of the latch 164 the shaft 165, which extends into the housing of the operating mechanism, is turned. When the shaft 165 is in the position illustrated in Fig. 10, a projection on this shaft, within the housing of the operating mechanism engages the trip-free latch of the operating mechanism and prevents closing operation of the circuit breaker operating mechanism, or effects tripping of the mechanism if the mechanism is in its circuit breaker closed position. If the shaft 165 is rotated in a clockwise direction, as seen in Fig. 11, the projection on the shaft clears the tripping latch of the operating mechanism and permits (but does not cause) normal operation of the circuit breaker. The shaft 165 cannot be turned clockwise from the position shown in Fig. 9 unless and until both holes 163 in the bars 150 and 151 are in alignment, at which time such turning is possible, and the portion 166 of the latch enters both aligned holes. Thereafter, in order to move the bars 150 and 151 laterally from the position of Fig. 11, it is necessary first to turn the latch 164 out of engagement with the two aligned holes 163, thus tripping the circuit breaker or, if the circuit breaker is already in its open position, preventing closure thereof. When this has been done, the bars 150 and 151 may be moved laterally to the position shown in Fig. 10. The ends of the bars now clear the flanges 148 and 149 on the pipes 133 and 146 so that the pipes drop by gravity and permit retraction of the circuit breaker.

The pipes 133 and 146 drop until they engage angle stops 168 (Figs. 5 and 7) which limit their movement to the position illustrated in Fig. 10. At this time the flanges 148 and 149 prevent the bars 150 and 151 from moving back to the position illustrated in Fig. 11, and thus prevent alignment of the two holes 163 in those bars, thereby preventing manual movement of the latch in a clockwise direction to free the tripping mechanism and permit circuit breaker operation.

Figure 8:
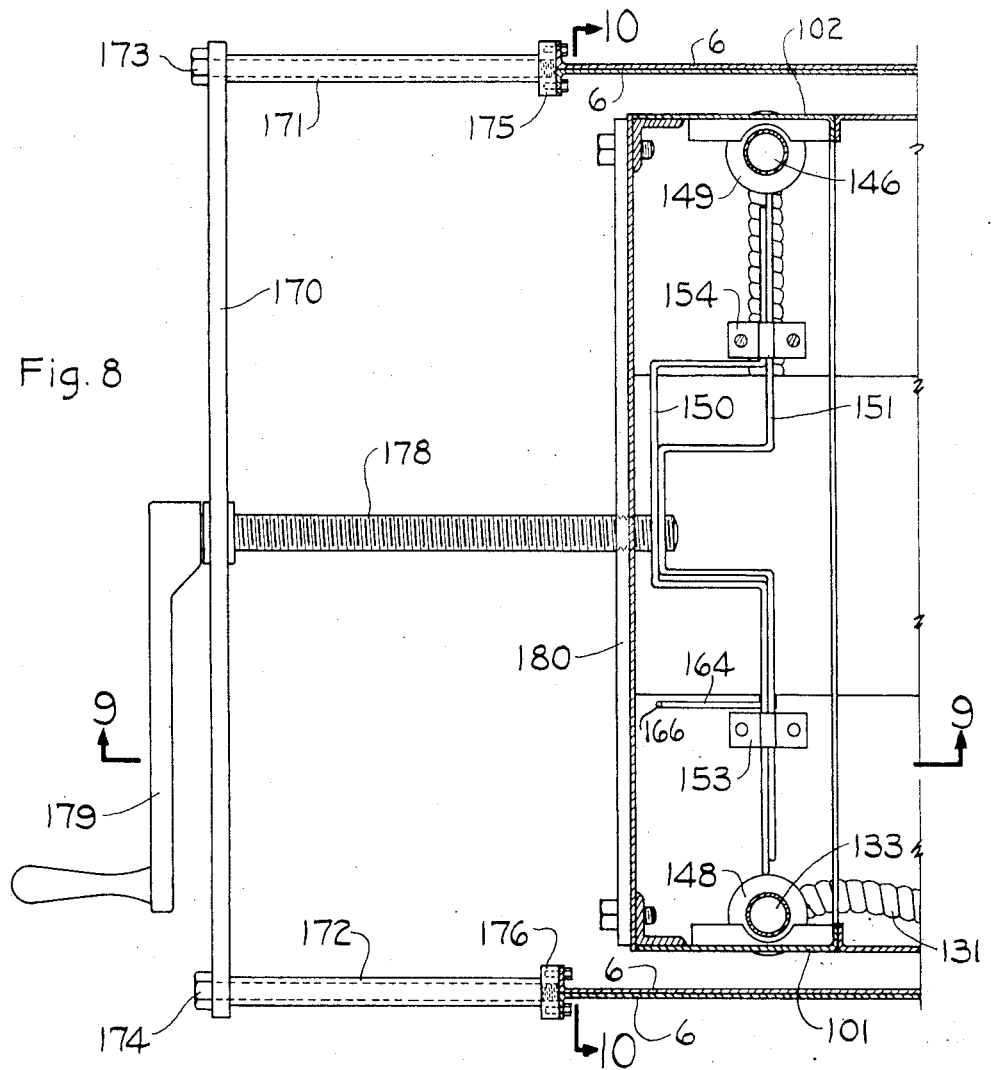
Fig. 8 is a view showing the circuit breaker retracting mechanism in position for inserting or retracting the circuit breaker, said view being taken along the line 8—8 of Fig. 2 and looking in the direction of the arrows.
Figure 9:
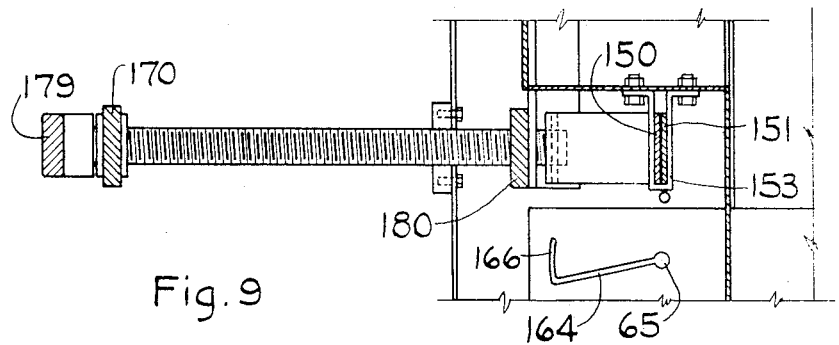
Fig. 9 is a sectional view taken along the line 9—9 of Fig. 8, and looking in the direction of the arrows.
Figure 28:
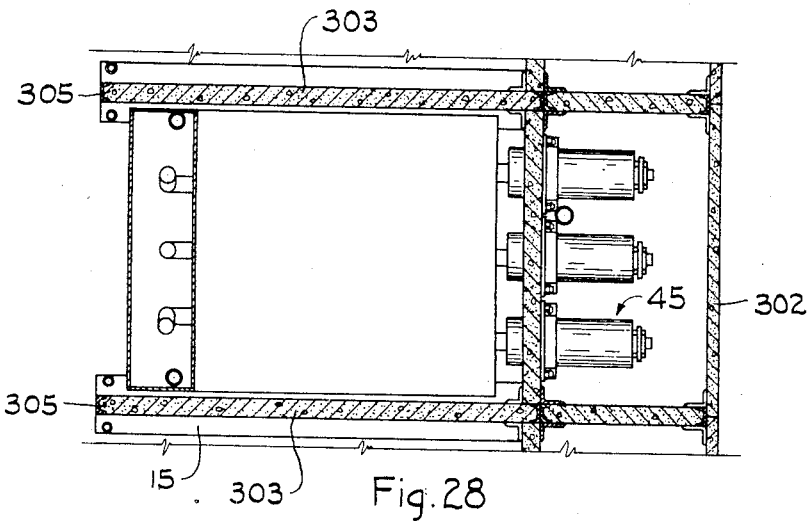
Fig. 28 is a sectional view taken along the line 28—28 of Fig. 29 and illustrating the principles of the present invention as applied to a precast concrete switchgear.

In order to move the circuit breaker in its cell, when the interlock has been released as above pointed out, I employ a drawout mechanism, one embodiment of which is illustrated in Figs. 8 and 9. This drawout mechanism comprises a cross-bar 170 to which are secured tubular collars 171 and 172 through which bolts 173 and 174 with comparatively long shanks, extend.

The bolts 173 and 174 are threaded into nuts 175 and 176, respectively, that are permanently secured to the side walls 6 of adjacent cells, as is indicated in Fig. 8. A screw 178 swivels in the cross-bar 170, being held against longitudinal movement therein, and is provided with a handle 179 for turning the same. The movable circuit breaker carrying mechanism has a bar 180 secured across the front face thereof, which bar is threaded to receive the screw 178. Turning of the screw 178 through the threaded hole in the bar 180 threads the screw into the bar. Thereafter the bolts 173—174 are threaded into the nuts 175 and 176 to secure the drawout mechanism in place. Further turning of the screw 178 causes the screw to draw the circuit breaker supporting structure, with the circuit breaker, outwardly of the cell. On the other hand, if an attempt is made to insert the screw 178 through the bar 180 when the holes 160 and 161 are not in alignment, the screw engages the bar 150 which prevents further insertion of the screw, thereby preventing retraction of the circuit breaker. Upon turning of the screw 178, when the bars 150 and 151 have been moved to bring the holes 160—161 into alignment, the circuit breaker is retracted, the wheels 84—84 riding upon the rails 15. A pin 185, having a flange intermediate the ends thereof, is dropped through aligned holes 186 in the flanges of the rail 15 so that the upward projecting portion of the pin limits the outward movement of the circuit breaker on the rails. The retracting mechanism may be removed by merely unthreading the bolts 173 and 174 and then unscrewing the screw 178 from engagement with the threaded hole in the bar 180. If this is done after the bolts 173—174 have been turned out of engagement 175—176, such turning of the screw does not force the circuit breaker into its cell, as is apparent from the construction previously described.

If it is desired to remove the circuit breaker from the cell, a truck having spaced rails 15'—15', (Fig. 15), is brought adjacent the cell so that the rails on the truck match with the rails 15 on the side wall 6 of the bus-bar compartment. Each of the channel-shaped rails 15' has a short channel 190 welded on the inside thereof and projecting forwardly thereof, as is illustrated in Figs. 15 and 16. When the rails of the truck are brought into engagement with the rails on the circuit breaker compartment, the forward projecting portions of the channels 190 enter the troughs of the channels 15 with the webs of the channels 190 bearing against the webs of the channels 15. The flanges of the channels 190 have holes 191 therein which register with the holes 186 so that a pin 192 may be dropped through the holes 186 and through the holes 191 of each pair of rails to lock the truck to the rails 15. The holes 186 are countersunk so that the head of the pin 192 is flush with the top surface of the flange of the rail 15. The circuit breaker may now be removed from the rails 15 to the rails 15' of the truck, after which the pins 192 may be removed to release the truck. The truck with the circuit breaker thereon can then be moved to any desired place.

When the circuit breaker has been taken out of the circuit breaker compartment, the insulating plate or barrier 10 may be removed to allow access to the bus-bar compartment from below the same. From the above description, it is apparent that the switchgear of the present invention is exceedingly simple and economical of construction since no extremely accurate alignment of parts is necessary, and it does not require extensive manufacturing equipment for its fabrication. The circuit breaker used is a standard circuit breaker of the type heretofore used in switchgear of the kind where the circuit breaker is brought into its operating position by a vertical upward movement. The only change wrought in the circuit breaker is that the standard circuit breaker disconnecting contacts have been removed. The movable structure 81 comprises an adapter for adapting a standard vertical lift or other type of circuit breaker for use in the present switchgear. Furthermore, since the circuit breaker, which constitutes the heaviest part of the switchgear, is supported adjacent the bottom of the circuit breaker compartment, I eliminate the need for heavy structural steel members for supporting the bus-bar compartment or for reinforcing the circuit breaker compartment. Since all contacts are enclosed, the side walls 6 of each cell may be replaced by an open framework supporting the bus-bars and providing a support for the rails 15. Also, the wheels on the movable circuit breaker supporting structure may be located appreciably lower than they are, as shown in Fig. 2, so that the wheels ride upon rails at the ground level.

In the event that the circuit breaker is of the type having its own supporting wheels, as in my pending application, Serial Number 97,541, the entire structure 81 may be dispensed with and the box 96 with its pipes and associated interlocking mechanism can be secured directly to the circuit breaker, the circuit breaker disconnects being then supported entirely by the circuit breaker.

Reference may now be had more particularly to Fig. 21 where I show an alternate method of supporting the bus-bars. In this construction the bus-bars are supported by insulating barriers 200, in the form of plates, that extend vertically between the bus-bar compartments of adjacent cells and thus close off the bus-bar compartment of each cell. Each one of the insulating barriers 200 is provided with three holes, one for each bus-bar, which holes may have porcelain or other insulating bushings 201 inserted therethrough, and through each one of which a bus-bar extends. The barriers 200 rest upon the top of the side walls 6—6 of adjacent units, and each barrier extends from the front of the bus-bar compartment to the rear wall 7 thereof.

In Figs. 22 and 23, I have shown an alternate circuit breaker retracting mechanism. This mechansim differs from that of Figs. 8 and 9 primarily in the manner whereby it is supported. The mechanism includes a pair of vertically extending legs 210—210 which are bent horizontally at their top to form arms 211—211 and joined by a cross-bar 212, the vertical legs 210, the arms 211 and the bar 212 comprising one integral metal member formed into the shape shown. The arms 210 are adapted to be placed in abutment with the side walls 6 of the circuit breaker compartment and are provided with a bifurcated latch 214 that embraces the side walls and is releasably held in place by a pin 215 in the side wall of the switch-cell. When the retracting mechanism is in this position, it cannot be moved with respect to the circuit breaker compartment. The bar 212 corresponds, functionally, to the bar 170 of the construction illustrated in Figs. 8 and 9. The operation of the mechanism described in Figs. 22 and 23 will be the same as that previously described for the mechanism shown in Figs. 8 and 9, and an additional description thereof at this point is not deemed necessary.

Reference may now be had more particularly to Figs. 24, 25 and 26 wherein I have shown the principles of the present invention applied to a switching unit, including two bus compartments, as for a double bus. The switching unit 220 includes the circuit breaker compartment 221, one bus compartment 222, another bus compartment at 223 and a current transformer and connecting compartment at 224. The circuit breaker compartment includes side wall 6, of a construction such as was previously described, except that the angles 8 and 9 (of Fig. 17) are omitted. In this construction the circuit breaker is mounted in a movable structure similar to that previously described, except that the two circuit breaker disconnecting contacts, which are carried by the movable structure, are both located at the rear wall of the movable structure in two horizontal rows one above the other instead of having one set advanced forward of the other, as in Fig. 2. The interlocking arrangement, venting arrangement, and circuit breaker pull-out arrangement in this construction are the same as in the construction previously described. The rear wall 227 of the switchgear has two sets of circuit breaker disconnecting contacts which cooperate with corresponding contacts 230 mounted on the ends of insulated conductors 231 carried by the movable structure and extending to the respective terminals of the circuit breaker. Each of the circuit breaker disconnect switches 228 and 229 is of a construction such as is shown more particularly in Fig. 32, which will be described more fully as this description proceeds. There are three switches 228 and three switches 229, one switch in each set being provided for each phase, since the circuit breaker is a three-phase breaker, and they are spaced apart a greater distance than the center to center distance between the circuit breaker bushings, as in the structure of Fig. 2, to allow the use of bare conductors for extending the circuit to and from those switches. The wall 227 terminates at the top of the circuit breaker compartment, which compartment is closed by an insulating plate 232 that is bolted in place. A wall 234, which comprises the rear wall of the main bus-bar compartment is flush with the wall 227 and carries three disconnecting or bus-bar selector switches 235, one for each phase, in horizontal alignment. The switches 235 are of a construction such as is shown more particularly in Fig. 35 and will be more fully described as this description proceeds. It is sufficient to state, for the present, that each switch 235 comprises a tubular insulating structure 236 mounted on the rear wall 234 and provided with a stationary contact finger 237 which is adapted to receive a movable contact 238 that is horizontally slidable within the tube 236, being actuated by means of an insulating rod 240. The movable contact 238 of each switch is connected, within the switch, to a switch terminal 241, the terminals of the respective switches being connected to the respective bus-bars in the compartment 222.

The upper bus compartment 223 includes a rear wall 245 which supports three switches 246, in horizontal alignment, each of the switches being of the same construction as the switch 235. The terminals 247 of the respective switches 246 are connected to the respective bus-bars of the bus in this compartment.

Each of the switch rods 240 is actuated by a link 242 connected to a common shaft 243 which is turned by a handle 244 to actuate all three switches 235 in unison. Each switch 246 is operated by an insulating pull rod 250, each pull rod being connected by a link 251 to a common shaft 252 which is turned by means of a link 253, a pull rod 254 and a handle 255 pivoted at 256.

Figure 1:
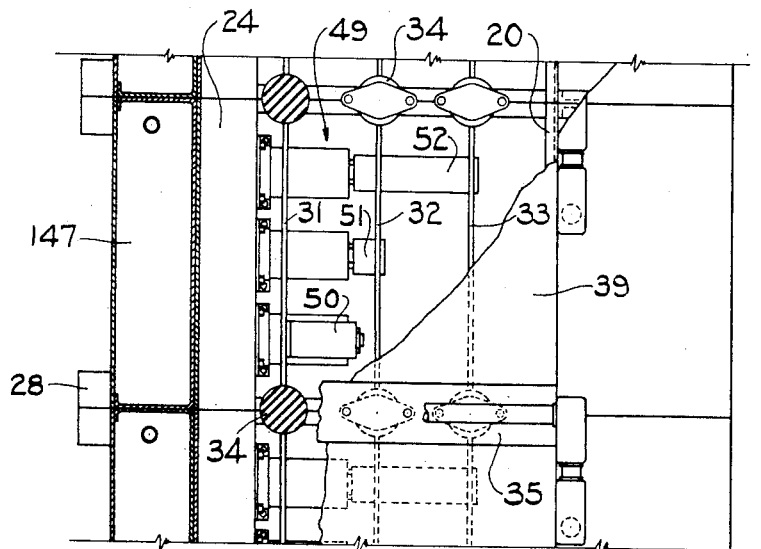
Fig. 1 is a plan view, in partial section, of a switchgear constructed in accordance with the teachings of the present invention, said view being taken along the line 1—1 of Fig. 2, and looking in the direction of the arrows.
Figure 2:
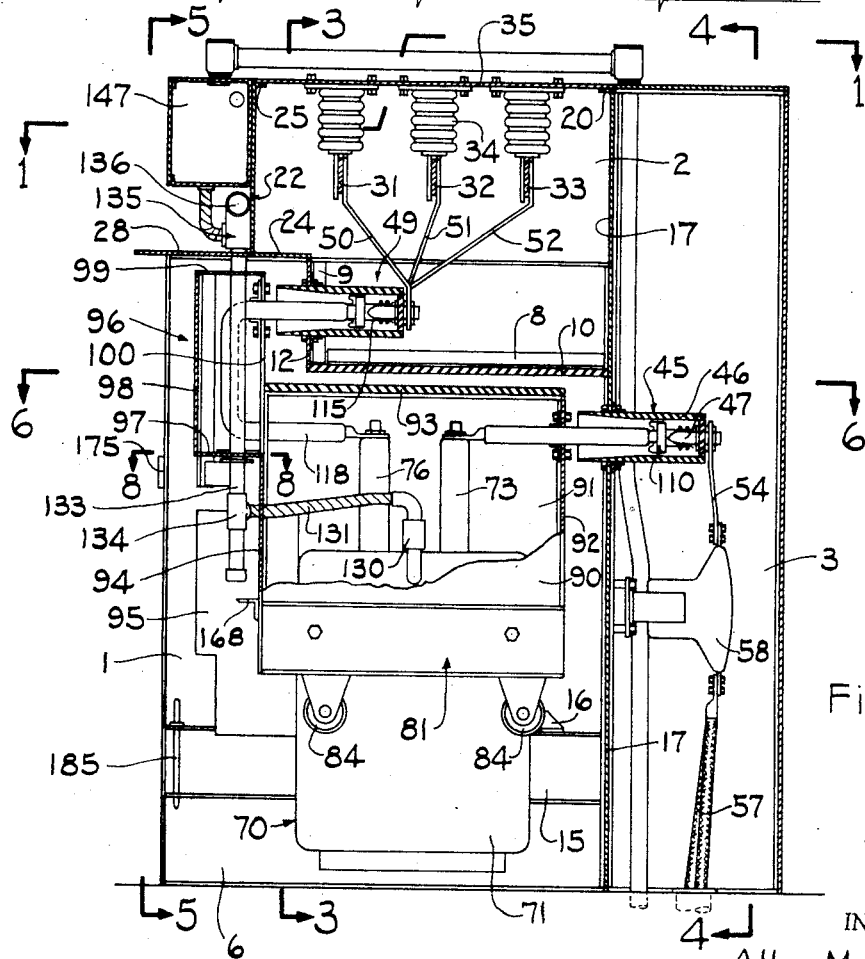
Fig. 2 is an elevational view, in partial section, of said switchgear, said view being taken along the line 2—2 of Fig. 3, and looking in the direction of the arrows.

A narrow metal plate 260, of a width corresponding to the width of the plate 35 of Fig. 1 supports three insulators at its lower side for carrying the lower bus-bars and it also supports three insulators at its upper side for carrying the upper bus-bars. These plates 260 are provided at the juncture between each pair of switchgear, in the manner illustrated in Figs. 1 and 26, and the space between the plates is closed off by another plate 261 corresponding to the plate 39 of Fig. 1.

The stationary terminals of the switches 228, 235 and 246 for each phase are connected together by conducting bars 264. The stationary terminals of the circuit breaker disconnecting switches 229 are connected by conductors 265, through current transformers 266, to the respective incoming or outgoing lines 267. The control conductors for controlling the operation of the circuit breaker, and for giving the various signalling indications of the operated or non-operated condition of the circuit breaker, are extended to the switchgear by way of a conduit 270 that passes through the compartment 224, thence across the switchgear through a conduit 271 and downwardly through a conduit 272 to a juncture box 273.

From the above description it is apparent that the line conductors 267 may be connected through the circuit breaker to either or both buses, and that the buses may be interconnected, by means of the selector switches 235 and 246 independently of the circuit breaker.

In Fig. 27, I have illustrated, diagrammatically, a switchgear which is adapted to establish connections between an incoming or outgoing line and either a main or a transfer bus; that is, through a circuit breaker to the main bus or through a selector switch to the transfer bus. The bus compartment of this switchgear is indicated at 280 and is of a construction exactly like that of the switchgear illustrated in Fig. 2. A main bus compartment 281 is located above the circuit breaker compartment, being of a construction identical with the bus compartment of Fig. 2. A transfer bus compartment 282 is located above the bus compartment 281. The bus-bars of the bus compartment 282 are connected to the respective ones of three horizontally aligned selector switches 283 of a construction such as is shown in Fig. 35, and in the same manner as the bus-bars are connected to the switches 246 of Fig. 24. The three switches 283 are operated in exactly the same manner as are the switches 246 of Fig. 24, previously described. The incoming or outgoing line conductors are connected, through a current transformer, to the circuit breaker disconnecting contacts 285 in the same manner as in Fig. 2. In addition, the stationary terminals of the switches 283 and 285, of corresponding phases, are connected together by flat conductors 286 corresponding to the conductors 264 of Fig. 24.

It is apparent from the above description that the line may be connected to the main bus within the compartment 281 through the circuit breaker, or it may be connected to the transfer bus within the compartment 282 through selector switches 283 independently of the circuit breaker.

Figure 29:
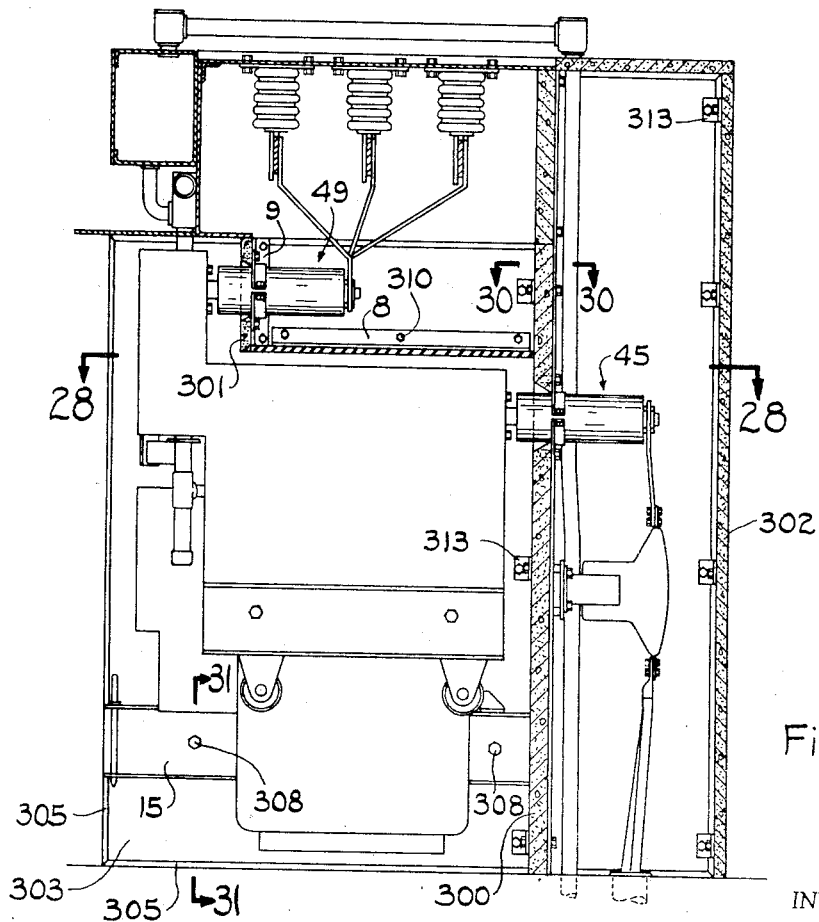
Fig. 29 is a sectional view through the precast concrete type of switchgear, said view being taken along the line corresponding to the section of Fig. 2.

Reference may now be had to Figs. 28 to 31 inclusive, wherein I illustrate the principles of the present invention as applied to a switchgear wherein the major parts of the stationary housing structure are formed of pre-cast concrete slabs, which slabs may readily be assembled in the field. The shape of this type of switchgear is exactly the same as that previously described in connection with Fig. 2, and the further description thereof is not necessary at this time, except for the fact that where concrete slabs are used for the side walls of the switchgear, a single slab serves as the dividing wall between two adjacent units, rather than two separate walls. The walls 300, 301, 302 and 303 comprise pre-cast, concrete slabs. Each side wall is reinforced by an inwardly facing channel-shaped iron or steel rim 305 which extends around the entire periphery of the wall. In the casting of the wall, the rim 305 constitutes a part of the mold. Suitable metal tubes or thimbles 306 are placed in the mold at the proper places where it is desired to have holes extend through the concrete slab for the reception of bolts to secure parts to the slab or to secure adjacent slabs together. The rails 15 are secured to opposite side walls 303 by bolts 308 that pass through inserts 306 in the concrete wall and secure the rails in place, as is illustrated in Figs. 29 and 31. The angle members 8 and 9 are secured to the side wall 303 by bolts 310 that extend through thimbles in the concrete at the proper places, said bolts securing the angle members in the same manner as the bolts secure the channels, as illustrated in Fig. 31. The stationary parts of the three disconnecting switches 45 and of the three disconnecting switches 49 are secured to the respective concrete walls 300 and 301 by bolts passing through threaded thimbles which are embedded in the concrete at the proper places during the manufacture of the concrete walls. The side and rear walls of the structure are secured together by angle clips 313 and bolts 314 that extend through tubular inserts at properly located places in the concrete walls, which inserts are located in the concrete during the process of forming the same. The rear wall 302 and the side walls of the current transformer compartment are connected together in the same manner. While I have shown the front wall of the bus-bar compartment as formed of sheet metal in the same manner as in Fig. 2, this wall may also be formed of pre-cast concrete in the same manner as are the other concrete walls. By forming the concrete slabs with a channel-shaped metal rim, I provide adequate reinforcement, and this rim also facilitates the casting operation. All of the holes for the securing bolts, as well as the holes through which the circuit breaker disconnecting switches extend, are formed during the molding and casting operation of the concrete slabs, thus greatly reducing the cost of installation.

Figure 34:
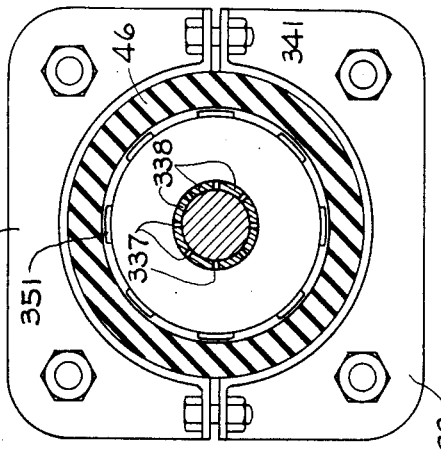
Fig. 34 is a sectional view taken along the line 34—34 of Fig. 32.
Figure 33:
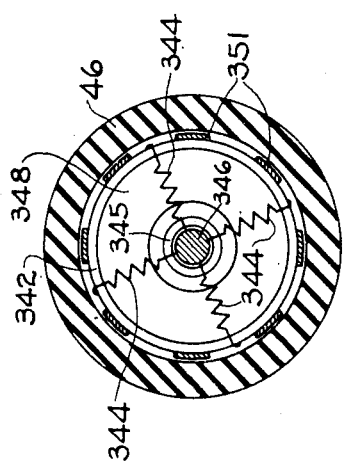
Fig. 33 is a sectional view taken along the line 33—33 of Fig. 32.

Reference may now be had more particularly to Figs. 32, 33 and 34 which show the construction of the circuit breaker disconnecting switches. As previously stated, the switch comprises a stationary contact 47 mounted within an insulating tube 46 that is secured to the rear wall 17 of the switchgear. The tube is secured in place by a split metal ring 331—332 which is bolted to the wall 17 and tightly embraces the tube 46, thus firmly holding the same in place. The movable contact structure is mounted at the end of an insulated conductor 334 that is encased in insulation 335 and suitably secured to the wall of the movable circuit breaker supporting structure.

The movable contact 110 comprises a copper tube 336 slitted longitudinally in a number of places 337 to form a plurality of fingers, in this instance eight in number, 338. The fingers are outwardly flared at their forward end to guide the same over the tapered forward portion of the contact finger 47 and are pressed towards one another into firm pressure contact with the finger 47 by a plurality of coiled springs 340 which surround the eight contact fingers 338 adjacent their outer end. The copper tube 336 is threaded into a circular plate 341 which in turn is threaded into a collar 342. The collar 342 floats about the center of the conductor 334, being held by four radially extending coiled springs 344 that extend from the collar 342 to a ring 345 that embraces a stud 346 threaded into a retaining copper tip 347 that is mounted at the end of the conductor 334. The springs 344 retain the collar 342, and therefore the contact fingers 338 centered with respect to the center line of the conductor 334, while permitting lateral movement of the contact making structure 110 with respect to the conductor 334. A disc 348, threaded into the collar 342 and having an opening appreciably larger than the diameter of the stud 346, limits the extent of lateral movement of the collar 342 with respect to the center line of the conductor 334 to an amount, in this instance, approximately $\frac{3}{8}''$ in each direction. A disc 349, threaded to the forward end of the stud 346, prevents escape of the collar 342 from the conductor 334. A plurality of flexible jumpers 351, in this instance eight in number, are welded at one end to the ring 342 and at their other end to the copper tip 347 whereby current is carried from the conductor 334 to the ring 342 and thence to the contact making member 110 without any sliding connections.

When the movable structure is away from the stationary structure, that is, the contact making member 110 is outside of the insulating tube 46, the tube 342 is centered on its support by the springs 344. If, on approaching tube 46 on the stationary structure, the conductor 334 is not concentric with the tube 46, the conducting ring 342 is guided by the insulating tube 46 out of concentricity with its supporting conductor 334 and into concentricity with the conducting stud or finger 47 in the insulating tube. It will be noted that the point of application of the forces which tend to center the conducting ring 342 in the insulating tube 46 are so located that they set up a true sliding action and hence the frictional resistances between the sliding surfaces are much less than they would be if the centering forces were applied against the fingers of the contacting tube 336 by the stud 47 within the insulating tube. Not until the movable structure is practically centered within the tube 46 does the stud or contact making finger 47 take over and complete the guiding function. Thus even if the contact making member of the movable structure is out of alignment with the contact stud in the stationary structure by as much as plus or minus $\frac{3}{8}''$, in this particular construction, perfect contact is made.

The selector switches 235 of Figure 24 may be of any preferred construction, preferably of the type wherein the contact making member moves in a straight line within an enclosing tube of insulation. One suitable switch is shown in Figure 18 of my pending application above referred to. Another suitable switch is shown in Figure 35 hereof. This switch comprises an insulating tube 360 which extends through the metal wall 234 of the switchgear. The switch is then held in place by means of a split metal ring or clamp 331—332, as is illustrated in Fig. 34. The metal contact stud 237 is mounted in the rear end 362 of the tube 360 by means of a disc of insulation 364 that closes the rear end of the tube 360 and is held in place by one or more screws 365. At its forward end the switch comprises a copper ring 368 which fits around the tube 360 and is secured in place by means of one or more screws 369. A copper, or other conducting tube 370, is slit longitudinally almost, but not completely, throughout its length to form a plurality of contact fingers 371, in this instance eight in number, that are held together by the unslit portion of the tube 370. The fingers are bent somewhat towards one another and are surrounded by one or more coiled springs 372 that exert a radially inward pressure adjacent the outer ends of the fingers 371. A second ring 374 is press-fitted into the end of the tube 370 and the two are press-fitted into the ring 368.

A copper or other conducting tube 378 extends through the ring 374, being slidable therethrough, and is engaged by the fingers 371 of the tube 370, which fingers make a pressure contact with the tube 378. At its forward end the tube 378 has an internal copper or other conducting ring 380 press-fitted or otherwise secured therein, which ring has a copper or other conducting tube 381 press-fitted or otherwise secured within the collar. The tube 381 is also slitted at its forward end to form a plurality of prongs or contact fingers 382, in this instance eight in number, which are pressed radially inwardly by one or more coiled springs 383 that surround the fingers 382. The fingers 382 constitute the female contact making members of the switch, said fingers being adapted for movement over the stationary contact stud 237 and are pressed into firm pressure engagement with the stud by the springs 383. A collar 385 is fitted over the end of the tube 378 and serves to guide the forward end of that tube within the tube 360. The tube 378 is adapted to be moved longitudinally within the insulating tube 360 by means of an insulating rod 240, as previously described. When the tube 378 is moved forward so that the contact fingers 382 engage the contact stud 237, the rear end of the tube is still engaged by the contact fingers 371 so that a circuit is thus established from the stud 237, through the female contact fingers, the tube 378 and contact fingers 371 to the copper ring 368 which has the terminal 241 formed as an integral part thereof. A suitable copper lead extends from the terminal 241 to the appropriate bus-bar, as is illustated in Figs. 24 and 26.

In compliance with the requirements of the patent statutes I have here shown and described a preferred embodiment of my invention. It is, however, to be understood that the invention is not limited to the apparatus here shown, the same being merely illustrative of the principles of the invention. What I consider new and desire to secure by Letters Patent is:

1. Electric switching apparatus of the type comprising a plurality of cells each having a circuit breaker compartment and a bus bar compartment, circuit breaker disconnect contacts extending into said circuit breaker compartment, a switch unit movable into and out of said circuit breaker compartment and having disconnect contacts adapted to engage said first mentioned contacts, characterized by the fact that the supporting walls of the cells comprise separate pre-cast concrete slabs, and means for releasably securing the slabs together.

2. In combination with a stationary structure and a comparatively massive movable structure that is moved into and out of circuit establishing position with respect to the stationary structure, a switch for establishing circuit connections between the two structures, said switch including a contact member mounted on the stationary structure and a contact making member mounted on the movable structure and movable into engagement with the contact member, a tube of insulation carried by one of said members and adapted to surround the other member when the members are in engagement, said tube being outwardly flared at one end for guiding the contacts into alignment, floating supporting means for one of said contact members to permit free floating movement of said one member as the members are guided into alignment by said tube of insulation, and spring means separate from said floating supporting means for maintaining pressure engagement between said members.

3. A movable circuit breaker assembly structure including external switch contacts extending therefrom and adapted to make switching connections by a horizontal movement, said assembly including circuit breaker bushings and connections from the contacts through the bushings, said contacts being fixed against switch operating movement with respect to the breaker assembly, and said assembly being movable horizontally to establish and interrupt circuit connections to the breaker assembly through the switch contacts, a stationary structure into which the circuit breaker assembly is movable, said structure including switch contacts engaged by the first mentioned contacts by movement of the circuit breaker assembly into position in said stationary structure, and means for imparting an aligning movement to at least one of the cooperating contacts with respect to its supporting structure as the cooperating contacts approach one another and before they engage.

4. A movable circuit breaker assembly including external switch contacts extending therefrom and adapted to make switching connections by a horizontal movement, said assembly including circuit breaker bushings and connections from the contacts through the bushings, said contacts being fixed against switch operating movement with respect to the breaker assembly, and said assembly being movable horizontally to establish and interrupt circuit connections to the breaker assembly through the switch contacts, a stationary structure into which the circuit breaker assembly is movable, said structure including switch contacts engaged by the first mentioned contacts by movement of the circuit breaker assembly into position in said stationary structure, at least one of said switch contacts including a floating support, and means for guiding said floating supported switch contact into alignment with the other contact as the contacts approach one another and before they engage one another.

5. A movable circuit breaker assembly including external switch contact making members extending therefrom and adapted to make switching connections by a horizontal movement, said assembly including circuit breaker bushings and connections from the contacts through the bushings, spring means for maintaining a pressure engagement of the members when they establish switching connections, said contacts being fixed against switch operating movement with respect to the breaker assembly but mounted by means including a spring support separate from said spring means to permit free floating adjusting movement of the contact making member and the spring means, and said assembly being movable horizontally to establish and interrupt circuit connections to the breaker assembly through the contact making members.

6. Switchgear comprising a stationary structure including circuit breaker disconnecting contacts, said structure being adapted to receive a circuit breaker assembly, and a circuit breaker assembly movable in said structure and including circuit breaker disconnecting contacts adapted to engage the first mentioned contacts by movement of the breaker assembly, characterized by the fact that there is provided a floating spring support for at least one of the contacts of each pair of engaging contacts so constructed and arranged as to permit adjusting movement of said spring supported contact at right angles to the direction of circuit closing movement of the contacts, and there is provided means for guiding the floating contact within the limits of movement of the floating support into alignment with its cooperating contact as the circuit breaker is moved towards its position in the stationary structure and before the contacts come into engagement, whereby proper engagement is obtained between the contacts even when the contacts on the circuit breaker assembly are initially out of alignment with the contacts on the stationary structure.

7. Switchgear comprising a stationary structure including means forming circuit breaker compartment, a circuit breaker disconnecting contact carried by said structure and accessible for engagement from within the compartment, a movable structure within the compartment and carrying a cooperating contact movable into and out of engagement with the first mentioned contact by bodily movement of the movable structure within the stationary structure, characterized by the fact that there is provided a floating support for one of said contacts so constructed and arranged as to permit universal adjusting movement of the floating contact and there is provided means for guiding the floating contact within the limits of movement of the floating support into alignment with the other contact as the contacts approach one another and before they engage one another.

8. Switchgear comprising a stationary structure including means forming circuit breaker compartment, a circuit breaker disconnecting contact carried by said structure and accessible for engagement from within the compartment, a movable structure within the compartment and carrying a cooperating contact movable into and out of engagement with the first mentioned contact by bodily movement of the movable structure within the stationary structure, characterized by the fact that there is provided a floating support for one of said contacts so constructed and arranged as to permit universal adjusting movement of the floating contact within the limits of movement of the floating support into alignment with the other contact as the contacts approach one another and before they engage one another, and an enclosed circuit breaker unit carried by said movable structure and connections between a terminal of the circuit breaker and the contact of the movable structure, whereby movement of the movable structure establishes circuit connections to the breaker.

9. Electric switching apparatus including stationary means forming a circuit breaker compartment and a bus bar compartment above the circuit breaker compartment, a circuit breaker structure movable horizontally into and out of operative position in the circuit breaker compartment, cooperating disconnect contacts carried by said stationary means and by said circuit breaker structure and movable into engagement with each other, the disconnect contacts in the stationary structure being in two sets horizontally spaced from each other and the foremost part of the rear set of disconnect contacts of the stationary structure terminating rearwardly of the rearmost part of the forward set of disconnect contacts on the stationary structure and a horizontal barrier between the contacts on the stationary structure.

10. A horizontally movable circuit breaker assembly including a circuit breaker having a set of bushings through which conductors extend, horizontally disposed circuit breaker disconnect contact making members carried by the assembly and forming parts of disconnecting switches adapted to be operated by horizontal movement of the breaker assembly, a substantial part of said members being located above and in vertical alignment with the circuit breaker bushings, said members being connected to the conductors that extend through the bushings by connections that extend forward and then up and then back to said horizontally disposed contact making members.

11. A horizontally movable circuit breaker assembly including a circuit breaker having a set of bushings through which conductors extend, horizontally disposed circuit breaker disconnect contact making members carried by the assembly and forming parts of disconnecting switches adapted to be operated by horizontal movement of the breaker assembly, the major part of said members being located forwardly of the rearmost parts of the bushings and said members being connected to the conductors that extend through the bushings by connections that extend forward and then up and then back to said horizontally disposed contact making members, the contact making members being spaced farther apart than the spacing of the first mentioned conductors by an amount sufficient to permit dispensation of insulating barriers between the stationary terminals of the disconnecting switches of which said contact making members are a part.

12. Electric switchgear comprising means forming a circuit breaker compartment and a bus bar compartment above the circuit breaker compartment, a partition between the two compartments, said partition including a vertical wall adjacent the front of the circuit breaker compartment, a set of horizontal contact housings mounted in said wall and opening at their forward end in said circuit breaker compartment, a circuit breaker assembly movable horizontally in said circuit breaker compartment and having a set of bushings which are in a position rearward of the front of the housings when the assembly is completely inserted into the breaker compartment, and connections from said bushings extending forwardly thereof and then bent back and terminating in horizontally disposed contact making members movable into said contact housings.

13. Electric switchgear comprising means forming a circuit breaker compartment and a bus bar compartment above the circuit breaker compartment, a partition between the two compartments, said partition including a vertical wall adjacent the front of the circuit breaker compartment, a set of horizontal contact housings mounted in said wall and opening at their forward end in said circuit breaker compartment, a circuit breaker assembly movable horizontally in said circuit breaker compartment and having a set of bushings which are in a position rearward of the front of the housings when the assembly is completely inserted into the breaker compartment, and connections from said bushings extending forwardly thereof and then bent back and terminating in horizontally disposed contact making members movable into said contact housings, a set of horizontal contact housings at the rear of the circuit breaker compartment, said circuit breaker assembly having a second set of contact making members movable into said second contact housings by movement of the breaker assembly in said circuit breaker compartment.

14. Electric switchgear comprising means forming a circuit breaker compartment and a bus bar compartment above the circuit breaker compartment, a partition between the two compartments, said partition including a vertical wall adjacent the front of the circuit breaker compartment, a set of horizontal contact housings mounted in said wall and opening at their forward end in said circuit breaker compartment, a circuit breaker assembly movable horizontally in said circuit breaker compartment and having a set of bushings which are in a position rearward of the front of the housings when the assembly is completely inserted into the breaker compartment, and connections from said bushings extending forwardly thereof and then bent back and terminating in horizontally disposed contact making members movable into said contact housings, a set of horizontal contact housings at the rear of the circuit breaker compartment, said circuit breaker assembly having a second set of contact making members movable into said second contact housings by movement of the breaker assembly in said circuit breaker compartment, said partition between the compartments including a horizontal wall extending from said vertical wall to the rear of at least one of the compartments and removable independently of the contact housings to permit access to the bus compartment from below the same.

15. Electric switchgear comprising means forming a circuit breaker compartment and a bus bar compartment above the circuit breaker compartment, a partition between the two compartments, said partition including a vertical wall adjacent the front of the circuit breaker compartment, a set of horizontal contact housings mounted in said wall and opening at their forward end in said circuit breaker compartment, a circuit breaker assembly movable horizontally in said circuit breaker compartment and having a set of bushings which are in a position rearward of the front of the housings when the assembly is completely inserted into the breaker compartment, and connections from said bushings extending forwardly thereof and then bent back and terminating in horizontally disposed contact making members movable into said contact housings the center to center distances between the contact housings of the set being substantially greater than the center to center distances between the circuit breaker bushings.

16. Electric switchgear comprising means forming a circuit breaker compartment and another compartment above the circuit breaker compartment, a partition between the two compartments, said partition including a vertical wall adjacent the front of the circuit breaker compartment, a set of horizontal contact housings mounted in said wall and opening at their forward end in said circuit breaker compartment, a circuit breaker assembly movable horizontally in said circuit breaker compartment and having a set of bushings which are in a position rearward of the front of the housings when the assembly is completely inserted into the breaker compartment, and connections from said bushings terminating in horizontally disposed contact making members movable into said contact housings.

17. Electric switchgear comprising means forming a circuit breaker compartment and a bus bar compartment above the circuit breaker compartment, horizontally disposed bus bars in said bus bar compartment, a partition between the two compartments, said partition including a vertical wall adjacent the front of the circuit breaker compartment, a set of horizontal circuit breaker disconnect contact housings mounted in said wall and opening at their forward end in the circuit breaker compartment and having terminals at their back end within the bus bar compartment, connections between said terminals and the respective bus bars, a circuit breaker assembly movable horizontally in said circuit breaker compartment and having a set of bushings extending therefrom and conductors extending through the bushings, said conductors terminating in horizontally disposed contact making members movable into said contact housings by movement of the breaker into position within the circuit breaker compartment, the distances between the live parts of adjacent contact housings being greater than the distances between live parts of adjacent conductors that extend through the bushings by an amount sufficient to permit dispensation of insulating wrappings around the connections from the circuit breaker disconnect terminals to the bus bars.

18. Electric switchgear comprising means forming a circuit breaker compartment and another compartment above the breaker compartment, a partition between the two compartments including a vertical wall adjacent the front of the breaker compartment, a set of switch contacts in said other compartment and accessible from the breaker compartment through said vertical wall, a circuit breaker assembly movable horizontally in the breaker compartment to a position under said vertical wall and including contact making members in series with the circuit breaker and movable through said wall into engagement with said switch contacts in said other compartment.

19. Electric switchgear comprising means forming a circuit breaker compartment and another compartment above the breaker compartment, a set of disconnect switch contacts in said other compartment, a circuit breaker assembly movable horizontally in said breaker compartment and including cooperating disconnect switch contacts movable in the upper compartment into full engagement with the first mentioned switch contacts by horizontal movement of the breaker assembly.

20. Electric switchgear comprising means forming a circuit breaker compartment and another compartment above the breaker compartment with the circuit breaker compartment extending rearwardly of the front of the switchgear at least as far as does the other compartment, a set of disconnect switch contacts in said other compartment adjacent the front thereof, a circuit breaker assembly movable horizontally in said breaker compartment and including cooperating disconnect switch contacts movable in the upper compartment into full engagement with the first mentioned switch contacts by horizontal movement of the breaker assembly.

21. Electric switchgear comprising means forming a circuit breaker compartment and another compartment above the breaker compartment, a set of disconnect switch contacts in said other compartment, a circuit breaker assembly movable horizontally in said breaker compartment and including cooperating disconnect switch contacts movable in the upper compartment into full engagement with the first mentioned switch contacts by horizontal movement of the breaker assembly, and a floating support for at least one of the cooperating disconnect contacts.

22. Electric switchgear comprising means forming a circuit breaker compartment and another compartment above the breaker compartment, a horizontal partition between the two compartments, a set of disconnect switch contacts in said other compartment, a circuit breaker assembly movable horizontally in the breaker compartment and having a set of bushings rearwardly of and below the forward end of the horizontal partition when the assembly is moved to its operative position in the breaker compartment, and connections from said bushings terminating in contact making members movable horizontally through the front of the other compartment into engagement with the disconnect contacts therein.

23. A movable circuit breaker assembly including disconnecting switch contacts adapted to make switching connections by a horizontal movement of the assembly, a stationary structure into which the assembly is movable, said structure including switch contacts engaged by the first mentioned contacts by horizontal movement of the circuit breaker assembly into the stationary structure, at least one of the cooperating switch contacts being flexible to permit a limited amount of self-aligning movement of the contacts, a floating support for at least one of the cooperating contacts to permit an additional amount of self aligning movement of the cooperating contacts in directions at right angles to the direction of movement of the assembly in the stationary structure, and means for effecting the last mentioned movement as the cooperating contacts approach one another and before they engage.

ALLEN M. ROSSMAN.